(12) United States Patent
Yoshida et al.

(10) Patent No.: US 10,804,777 B2
(45) Date of Patent: Oct. 13, 2020

(54) STATOR MANUFACTURING METHOD AND DEVICE THEREFOR

(71) Applicant: HONDA MOTOR CO., LTD., Minato-ku, Tokyo (JP)

(72) Inventors: Takashi Yoshida, Tochigi-ken (JP); Daiki Sakai, Tochigi-ken (JP); Hideaki Onda, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 325 days.

(21) Appl. No.: 16/062,116

(22) PCT Filed: Dec. 14, 2016

(86) PCT No.: PCT/JP2016/087148
§ 371 (c)(1),
(2) Date: Jun. 14, 2018

(87) PCT Pub. No.: WO2017/104685
PCT Pub. Date: Jun. 22, 2017

(65) Prior Publication Data
US 2018/0375409 A1    Dec. 27, 2018

(30) Foreign Application Priority Data
Dec. 18, 2015   (JP) ................. 2015-246860

(51) Int. Cl.
*H02K 15/00* (2006.01)
*H02K 15/085* (2006.01)
*H02K 15/04* (2006.01)

(52) U.S. Cl.
CPC ....... *H02K 15/085* (2013.01); *H02K 15/0087* (2013.01); *H02K 15/0414* (2013.01); *Y10T 29/49009* (2015.01)

(58) Field of Classification Search
CPC ............. H02K 15/085; H02K 15/0087; H02K 15/0414; H02K 15/0428; Y10T 29/49009;
(Continued)

(56) References Cited

U.S. PATENT DOCUMENTS 6,557,239 B2 *  5/2003  Takahashi ......... H02K 15/0428
                                                                29/596
7,140,098 B2 * 11/2006  Maeda ............... H02K 15/0414
                                                                29/732
(Continued)

FOREIGN PATENT DOCUMENTS

JP          2001-197709      7/2001
JP          5680159          3/2015

OTHER PUBLICATIONS

International Search Report and Written Opinion for International Application No. PCT/JP2016/087148 dated Mar. 21, 2017, 12 pages.

*Primary Examiner* — Donghai D Nguyen
(74) *Attorney, Agent, or Firm* — Amin, Turocy & Watson, LLP

(57) ABSTRACT

The present invention pertains to a stator manufacturing method and a device therefor. All of segments are twisted in order to obtain a stator, the linear sections of the segments being inserted into slots in a stator core. The segments on the inner peripheral side are subsequently twisted after the segments on the outer peripheral side are untwisted. In order to achieve this, e.g., a fourth spindle that is positioned on the outermost peripheral side and is one of the first through fourth spindles for twisting the segments is disconnected from a fourth motor and brought to a non-rotatable state. The following is then performed in sequence: the third spindle is disconnected from a third motor and twisted, and the second spindle is disconnected from the second motor and twisted.

8 Claims, 18 Drawing Sheets

(58) Field of Classification Search
CPC ......... Y10T 29/49073; Y10T 29/59143; Y10T 29/53161
USPC .................................. 29/596, 606, 732, 736
See application file for complete search history.

(56) References Cited

U.S. PATENT DOCUMENTS

2001/0007169 A1   7/2001   Takahashi et al.
2015/0059164 A1   3/2015   Onda et al.

* cited by examiner

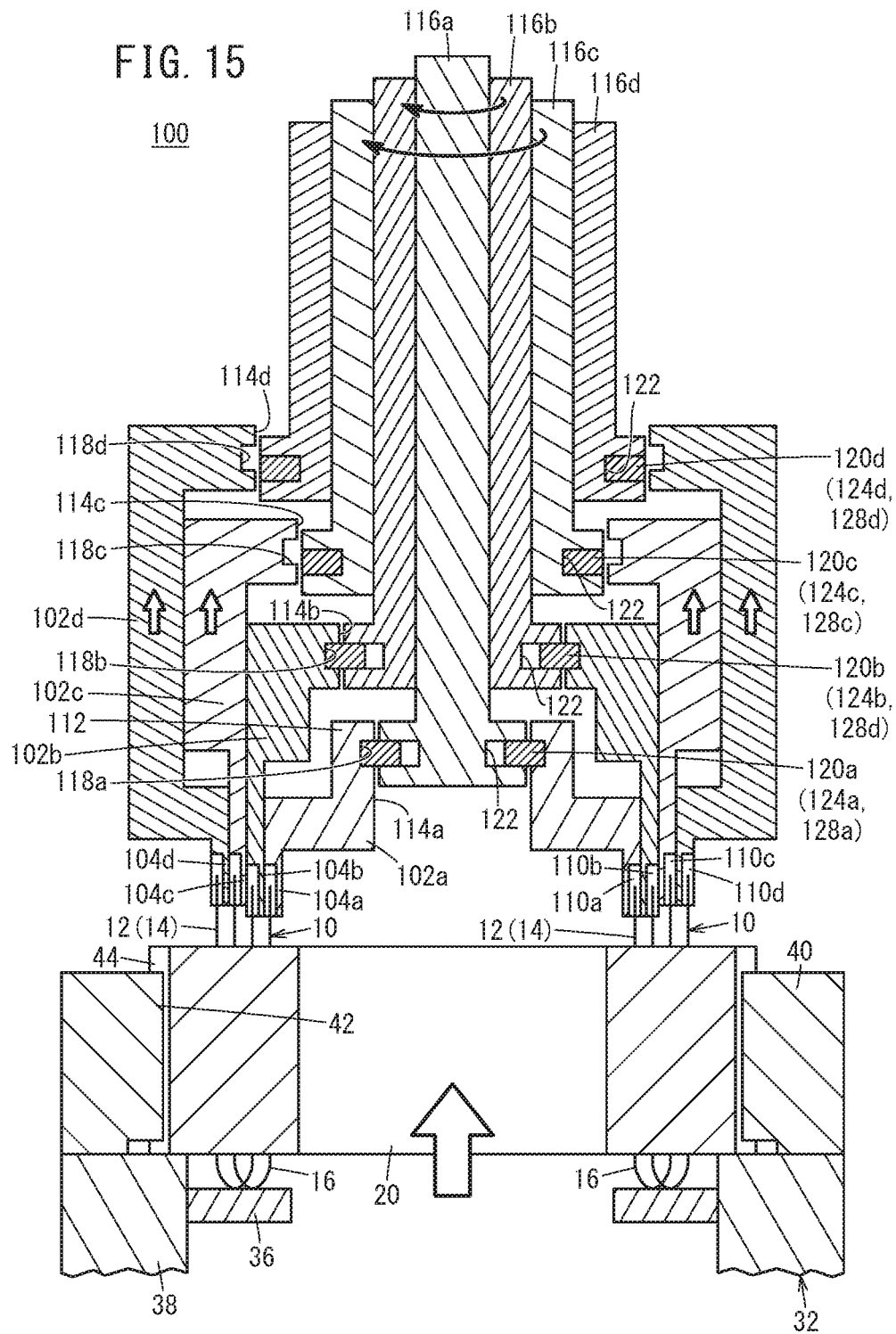

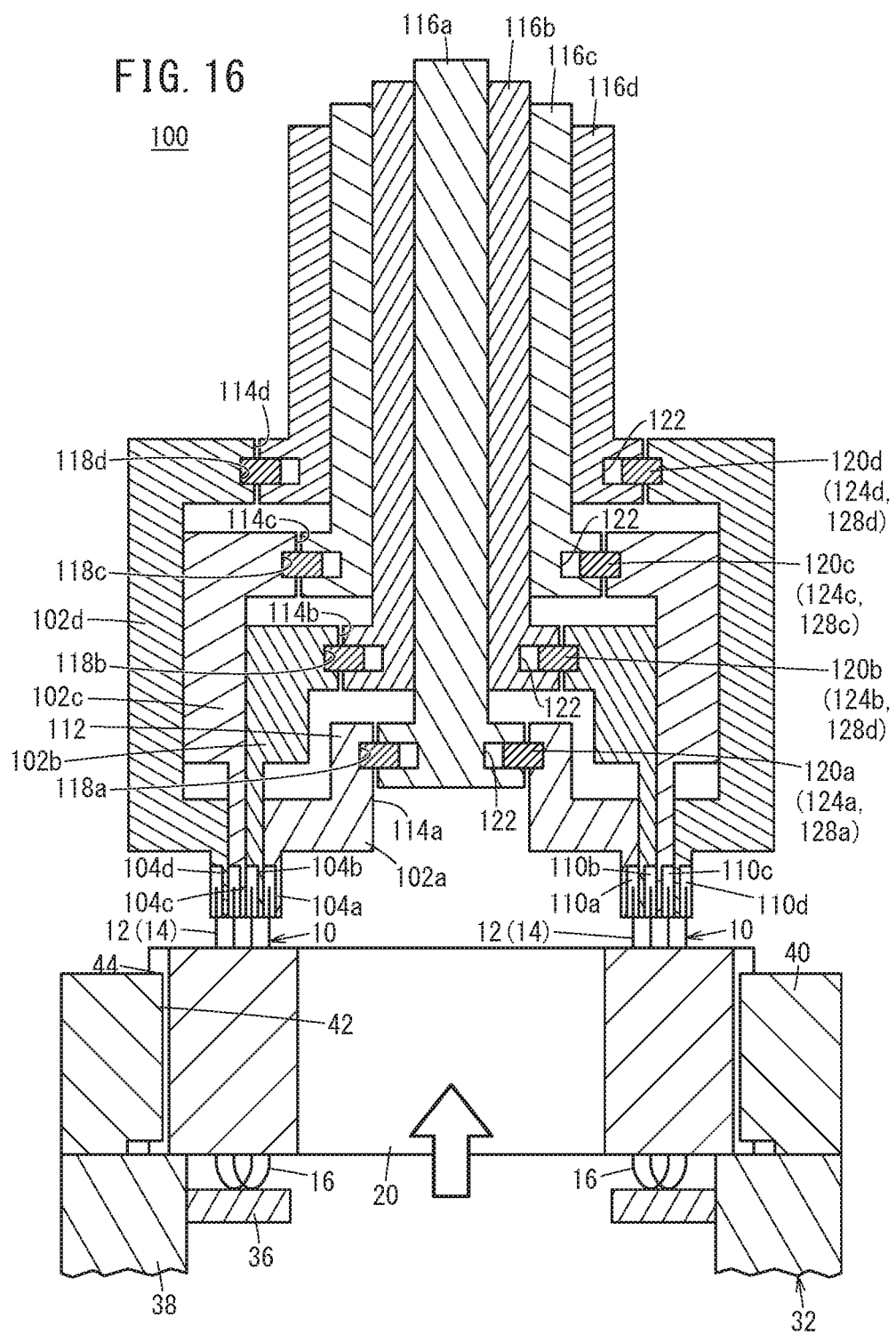

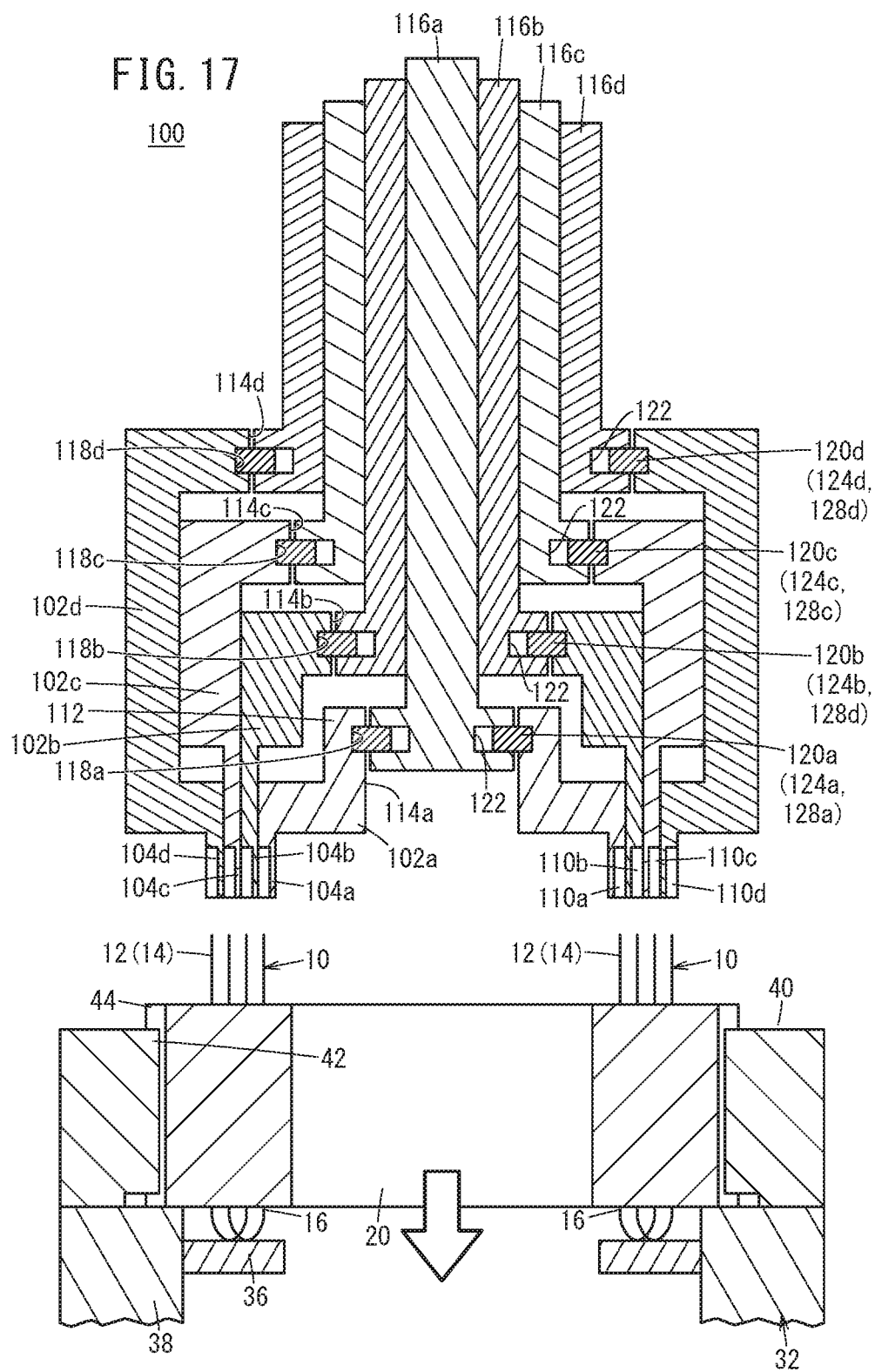

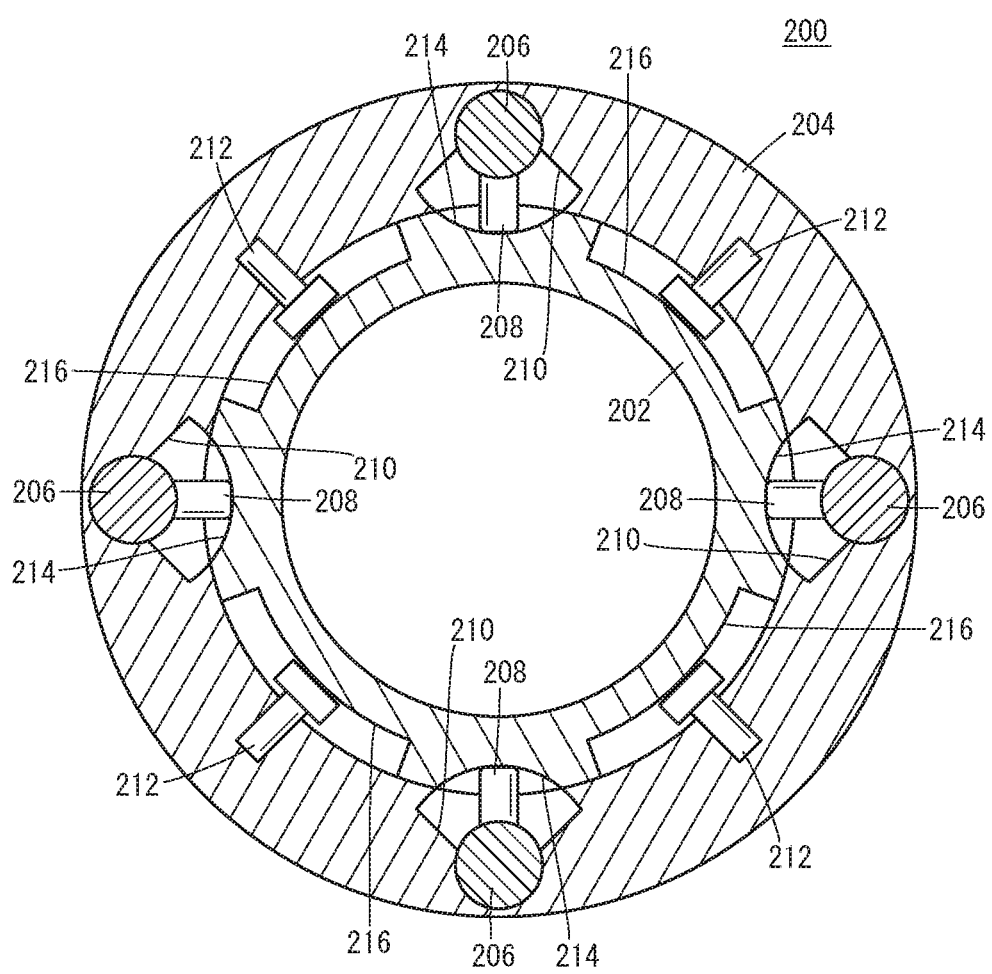

STATOR MANUFACTURING METHOD AND DEVICE THEREFOR

TECHNICAL FIELD

The present invention relates to a method for producing a stator and an apparatus therefor (a stator manufacturing method and a device therefor), the method which obtains a stator by inserting segments for a coil into slots formed in a stator core.

BACKGROUND ART

A stator is known, the stator obtained by inserting a segment for a coil (hereinafter simply written also as a "segment") into two of a plurality of slots formed in a stator core, which has a shape of an annular ring, in a circumferential direction thereof. Here, the segment has a first linear portion, a second linear portion that extends in parallel with the first linear portion and faces the first linear portion, and a turn portion that bends and connects to the second linear portion from the first linear portion, and therefore the segment is substantially U-shaped. Since the plurality of slots are radially formed, the first linear portion faces the inner peripheral side of the stator core and the second linear portion faces the outer peripheral side, for example.

The ends of the first linear portion and the second linear portion protrude from the slots. These protruding parts are twisted and bent in a parallel state and then joined together by an appropriate method such as TIG welding. By this joining, an electrical path is formed between the segments.

In Japanese Laid-Open Patent Publication No. 2001-197709, a method for performing the above-described twisting and bending is proposed. That is, settings are made such that the closer to the outer peripheral side an end is, the greater the length of a protrusion of the end, which is not yet twisted and bent, becomes. Then, an annular jig sandwiching the side faces of the end is rotated in a circumferential direction, whereby the end is moved in the circumferential direction. Since the segments move in the height direction of the stator core at this time, the jig on the inner peripheral side and the jig on the outer peripheral side are individually moved in the height direction. The angle of rotation of the jig on the outer peripheral side is the same as the angle of rotation of the jig on the inner peripheral side.

However, in this case, it is necessary to produce segments whose first linear portions or second linear portions are different in length so that the lengths of protrusions of the ends, which are not yet twisted and bent, are different. For this purpose, a plurality of types of molds have to be prepared to obtain segments which are different in size. Therefore, a problem of an increase in cost arises. Moreover, the segments have to be arranged in order, and, if the segments are arranged in the wrong order, the segments have to be arranged again, which results in complexity and a reduction in production efficiency.

Thus, in Japanese Patent No. 5680159, the applicant of the present application has proposed making the neutral lines used for twisting and bending of segments vary from layer to layer.

SUMMARY OF INVENTION

A main object of the present invention is to provide a method for producing a stator, the method that can perform twisting and bending of a segment efficiently and easily.

Another object of the present invention is to provide a stator production apparatus for carrying out the above-described production method.

An embodiment of the present invention provides a method for producing a stator, the method by which a stator is obtained by inserting, into slots formed in a circumferential direction of a stator core, segments for a coil, each being substantially in a shape of a letter U and including a first linear portion and a second linear portion which extend substantially in parallel with each other and face each other and a turn portion which connects to the first linear portion and the second linear portion. The method includes: a step of inserting a plurality of the segments for a coil into the slots in a parallel state, with one of the first linear portion and the second linear portion being located on an inner peripheral side of the stator core and another of the first linear portion and the second linear portion being located on an outer peripheral side; a step of inserting an end of the first linear portion or the second linear portion, the end exposed from the slot, into each of insertion concave portions of a plurality of twisting and bending jigs which are independently rotatable; a step of twisting and bending all the segments for a coil by rotating all of the plurality of twisting and bending jigs at a predetermined angle while moving the stator core toward the plurality of twisting and bending jigs; and a step of further twisting and bending the segments for a coil on the inner peripheral side by putting the segment for a coil on the outer peripheral side into a state where the segment for a coil is not twisted by not allowing the twisting and bending jig with the insertion concave portion into which the end of the first linear portion or the second linear portion of the segment for a coil is inserted, to rotate, and rotating, at a predetermined angle, the twisting and bending jigs with the insertion concave portions into which the ends of the first linear portions or the second linear portions of the segments for a coil on the inner peripheral side are inserted while moving the stator core toward the plurality of twisting and bending jigs.

That is, in the present invention, after all the segments are twisted and bent, the twisting and bending jig that twisted and bent the segment (the segment which does not need further twisting and bending) whose linear portion is inserted into the slot on the outer peripheral side thereof is put into a state where the twisting and bending jig cannot rotate and, in this state, the segment (the segment which needs further twisting and bending) whose linear portion is inserted into the slot on the inner peripheral side thereof is further twisted. Since the twisting and bending jig on the outer peripheral side does not rotate, the segment whose linear portion is inserted into the slot on the outer peripheral side thereof is not further twisted. Thus, even with the segments of the same shape and size, it is possible to avoid a situation in which, when the segment on the inner peripheral side is further twisted, the segment on the outer peripheral side is twisted and this causes the lengths of protrusions of the linear portions from the slot to differ from one another.

Thus, it is not necessary to prepare a plurality of types of segments with linear portions having different lengths. It goes without saying that there is no need to prepare a plurality of types of molds to produce a plurality of types of segments. This makes it possible to achieve cost reduction accordingly.

Moreover, it is possible to insert the segments, which were randomly picked out, into the slots without specifying the order in which the segments are arranged. Furthermore, there is no need to make the neutral lines used for twisting and bending of the segments vary from layer to layer. This makes it easy to insert the segments into the slots and therefore makes it possible to improve stator production efficiency.

To put the twisting and bending jig into a state where the twisting and bending jig cannot rotate, for instance, the twisting and bending jig which finished twisting and bending of the segment whose linear portion is inserted into the slot on the outer peripheral side thereof only has to be moved in a direction in which the twisting and bending jig moves away from the stator core when the segment for a coil on the inner peripheral side is twisted and bent. For this purpose, for instance, it is necessary simply to provide a stopper that restricts the displacement of the twisting and bending jig and release the stopper when twisting and bending becomes unnecessary.

Moreover, another embodiment of the present invention provides a stator production apparatus for obtaining a stator by twisting and bending segments for a coil which are inserted into slots formed in a circumferential direction of a stator core, the segments for a coil each being substantially in the shape of a letter U and including a first linear portion and a second linear portion which extend substantially in parallel with each other and face each other and a turn portion which connects to the first linear portion and the second linear portion. The stator production apparatus includes: a stator core holding jig configured to hold the stator core with the slots into which a plurality of the segments for a coil are inserted in a parallel state, with one of the first linear portion and the second linear portion being located on an inner peripheral side of the stator core and another of the first linear portion and the second linear portion being located on an outer peripheral side; a plurality of twisting and bending jigs configured to be independently rotatable and including insertion concave portions formed therein, wherein an end, which is exposed from the slot, of the first linear portion or the second linear portion is inserted into the insertion concave portions; rotating mechanisms, each configured to rotate a corresponding one of the plurality of twisting and bending jigs; a displacing mechanism configured to displace the stator core holding jig in a direction in which the stator core holding jig moves away from or closer to the twisting and bending jigs; and stoppers configured to restrict or allow movements, in a height direction of the stator core, of the plurality of twisting and bending jigs by being displaced.

By adopting such a structure, after all the segments are twisted and bent, the segment whose linear portion is inserted into the slot on the inner peripheral side thereof can be further twisted in a state where the twisting and bending jig that twisted and bent the segment whose linear portion is inserted into the slot on the outer peripheral side thereof cannot rotate. That is, even though the segments of the same shape and size are used, it is possible to obtain a stator in which the lengths of protrusions of the linear portions from the slot coincide with each other. This makes it possible to obtain the stator efficiently and reduce the cost thereof.

When the twisting and bending jig which finished twisting of the segment is released from the stopper, the twisting and bending jig becomes displaceable by following the movement of the stator core in the core height direction, for example. Since the twisting and bending jig moves (is displaced) in the above-described manner when the segment on the inner peripheral side is twisted, rotation by the action of the rotating mechanism becomes impossible.

A preferred example of the stopper is a piston. In this case, it is necessary simply to restrict the displacement of the twisting and bending jig by applying a pressing force thereto from the piston and make the twisting and bending jig displaceable by releasing the twisting and bending jig from the pressing force.

Another preferred example of the stopper is a displaceable pin. By making this pin enter a concave portion for engagement, for example, it is possible to achieve a state where the pin functions as the stopper. To deactivate the stopper function, the pin only has to be separated from the concave portion.

The pin may be a pin that is linearly displaced (moves in a straight line) or a pin whose phase is changed (which turns).

As described above, according to the present invention, after all the segments are twisted and bent, in a state where the segment on the outer peripheral side is not further twisted by not allowing the twisting and bending jig on the outer peripheral side to rotate, the segment on the inner peripheral side is further twisted by rotating the twisting and bending jig on the inner peripheral side. Since the segment on the outer peripheral side is not further twisted at this time, even with the segments of the same shape and size, the lengths of protrusions of the linear portions from the slot coincide with each other.

Therefore, it is not necessary to prepare a plurality of types of segments with linear portions having different lengths or produce a plurality of types of molds. This makes it possible to achieve cost reduction accordingly.

Moreover, it is possible to insert the segments, which were randomly picked out, into the slots without specifying the order in which the segments are arranged and it is not necessary to make the neutral lines used for twisting and bending of the segments vary from layer to layer. This makes it easy to insert the segments into the slots and therefore makes it possible to improve stator production efficiency.

BRIEF DESCRIPTION OF DRAWINGS

FIG. 15 is a longitudinal sectional view of the principal portions, the longitudinal sectional view depicting a state where an outermost peripheral spindle and a spindle next to the outermost peripheral spindle in an inward direction move upward;

FIG. 16 is a longitudinal sectional view of the principal portions, the longitudinal sectional view depicting a state where all the spindles are coupled again to all the rotary shafts;

FIG. 17 is a longitudinal sectional view of the principal portions, the longitudinal sectional view depicting a state where the stator core moves downward and the linear portions are exposed from the insertion concave portions of the spindles; and FIG. 18 is a horizontal sectional view of principal portions of a stator production apparatus according to a third embodiment of the present invention.

DESCRIPTION OF EMBODIMENTS

Hereinafter, a method for producing a stator according to the present invention will be described in detail with reference to the accompanying drawings with preferred embodiments thereof in connection with a stator production apparatus for carrying out the method. In the following description, a segment for a coil will be simply written also as a "segment".

Figure 1:
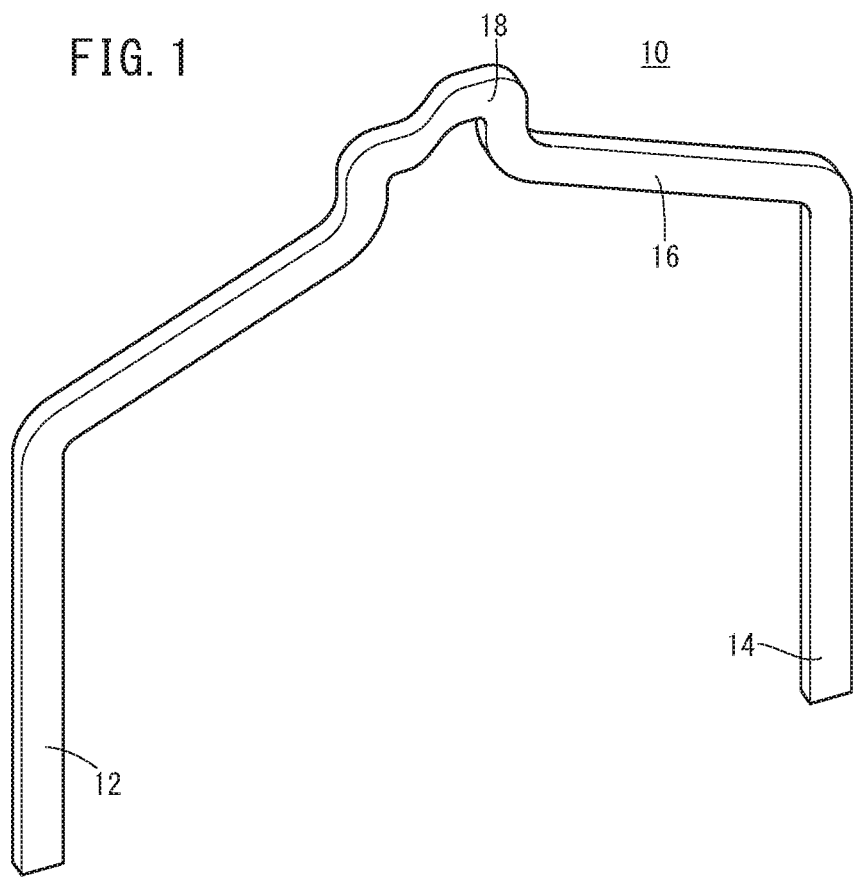
FIG. 1 is a schematic overall perspective view of a segment for a coil (a segment) which becomes an electromagnetic coil of a stator.

First, a stator will be described. FIG. 1 is a perspective explanatory diagram depicting only a segment 10 which is inserted into a stator core (see FIG. 2). The segment 10 has a first linear portion 12, a second linear portion 14 which extends in parallel with the first linear portion 12, and a turn portion 16 that is interposed between the first linear portion 12 and the second linear portion 14. The turn portion 16 bends toward the second linear portion 14 from the first linear portion 12; therefore, the segment 10 is substantially U-shaped.

In the turn portion 16, a crank portion 18 having a meander shape is formed. This crank portion 18 causes, in the segment 10, a difference in a direction in the radial direction of the stator core.

Figure 2:
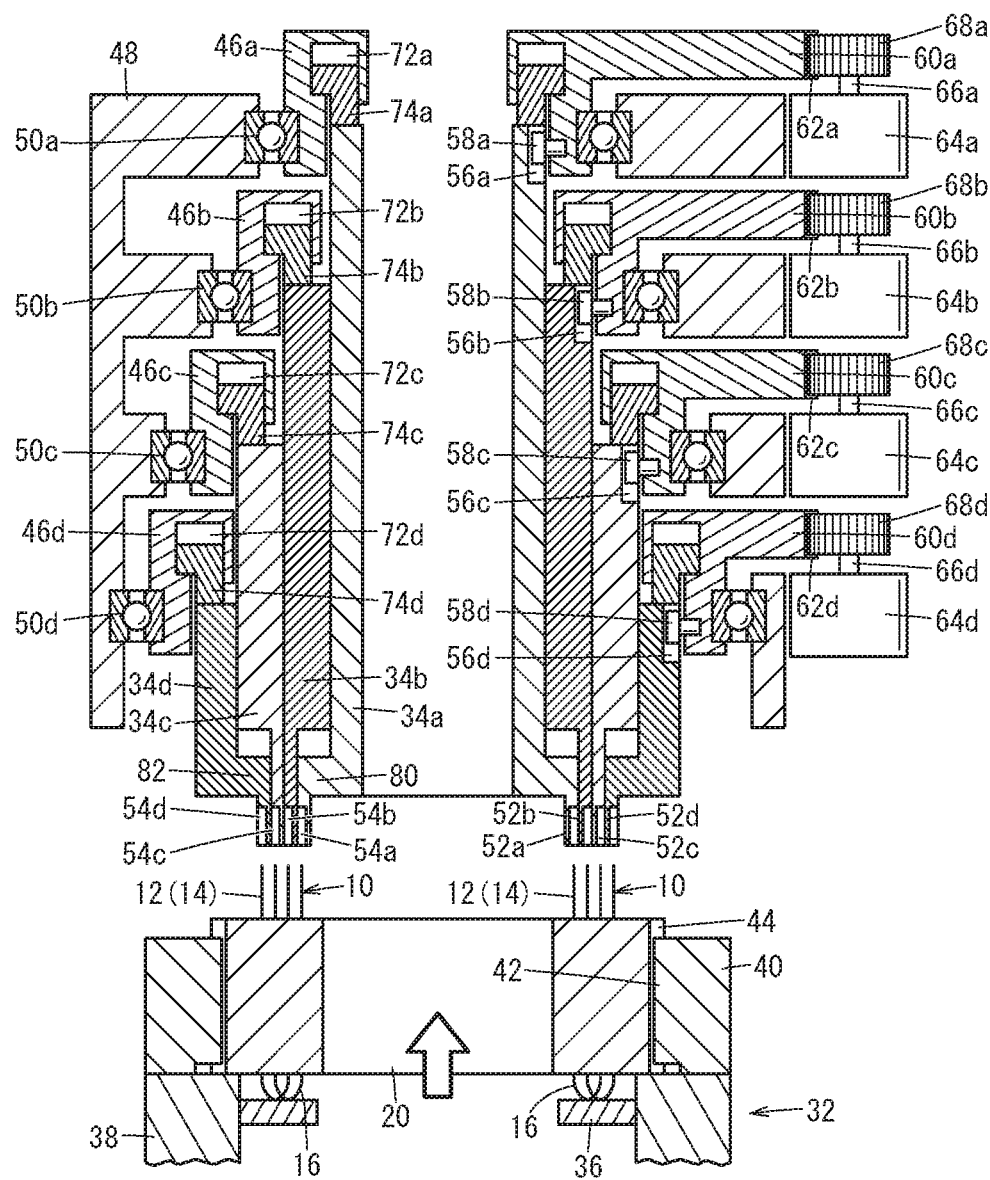
FIG. 2 is a longitudinal sectional view of principal portions of a stator production apparatus according to a first embodiment of the present invention.

The segment 10 having the above-described shape has the first linear portion 12 which is inserted into one of a plurality of slots (not depicted in the drawing) provided in a stator core 20 in FIG. 2 and the second linear portion 14 which is inserted into another slot of the plurality of slots. As a result, the segment 10 serves as an electrical path between these two slots. That is, continuity between the slot into which the first linear portion 12 is inserted and the slot into which the second linear portion 14 is inserted becomes possible. Hereinafter, when there is no need to differentiate between the first linear portion 12 and the second linear portion 14, the first linear portion 12 and the second linear portion 14 will be simply written as the "linear portion".

Then, as a result of the plurality of linear portions being joined together, a coil made up of a plurality of segments is formed. As a result, the stator is constructed. In the slot, a plurality of linear portions are arranged in parallel in the direction of the diameter of the stator core. In the present embodiment, in one slot, four linear portions of the first to fourth layers are arranged from the inner peripheral side to the outer peripheral side.

The segments 10 are twisted in a state where the linear portions thereof are inserted into the slots. Next, a stator production apparatus for obtaining a stator by twisting the segments 10 will be described in detail with three embodiments thereof.

FIG. 2 is a longitudinal sectional view of principal portions of a stator production apparatus 30 according to a first embodiment. This stator production apparatus 30 includes a lifting and lowering platform 32 that moves the stator core 20 upward and downward and first to fourth spindles 34a to 34d which are twisting and bending jigs for twisting the segments 10 while grasping the linear portions inserted into the slots of the stator core 20.

The lifting and lowering platform 32 includes a placement board 36 substantially in the shape of a ring, a holding jig 40 (a stator core holding jig) that holds the stator core 20, and a base 38 that supports the placement board 36 and the holding jig 40. The placement board 36 and the holding jig 40 move upward and downward with the base 38 by the action of an unillustrated lifting and lowering mechanism (displacing mechanism).

As a result of the outer peripheral part of the placement board 36 being supported on the inner wall of a hollow portion of the base 38, the placement board 36 is positioned and fixed in the above-described hollow portion. The turn portion 16 of each segment 10 is in contact with the upper end face of the placement board 36. That is, with the segment 10 being in an inverted position in which the turn portion 16 faces downward and the first linear portion 12 and the second linear portion 14 face upward, the first linear portion 12 and the second linear portion 14 are inserted into the slots.

The holding jig 40 is placed on the upper end face of the base 38. In the inner circumferential wall of the holding jig 40, a convex portion 42 is formed so as to protrude inward in the direction of the diameter. This convex portion 42 is inserted into a concave portion 44 formed in the outer peripheral wall of the stator core 20. This prevents the stator core 20 from rotating.

The first to fourth spindles 34a to 34d each have a substantially cylindrical shape and the heights (lengths) thereof become smaller in this order. These first to fourth spindles 34a to 34d are supported by a column 48 via first to fourth piston housings 46a to 46d, respectively. Between the first to fourth piston housings 46a to 46d and the column 48, first to fourth bearings 50a to 50d are interposed. This allows the first to fourth spindles 34a to 34d to rotate with respect to the column 48.

Each of the first to fourth spindles 34a to 34d grasps the first linear portion 12 or the second linear portion 14 protruding from the slot. That is, first, in the innermost peripheral first spindle 34a, a long first receiving portion 52a extending in the direction of the axis of the linear portion is formed so as to protrude therefrom. In this first receiving portion 52a, a first insertion concave portion 54a is formed. As will be described later, the linear portion protruding from the slot is inserted into the first insertion concave portion 54a.

At the upper end of the first spindle 34a, a first guide rail 56a is formed. Moreover, an unillustrated bearing is provided in the first piston housing 46a, and a first cam follower 58a is pivotally supported on this bearing. The first cam follower 58a slidably engages the first guide rail 56a; therefore, when the first cam follower 58a slides along the first guide rail 56a, the first spindle 34a moves upward and downward with this sliding.

The first piston housing 46a is hollow and has a substantially cylindrical shape, and, in an outer peripheral part thereof, a first fan-shaped portion 60a is formed so as to protrude therefrom with a predetermined central angle. In the side wall of the first fan-shaped portion 60a, a first teeth portion 62a is formed. Meanwhile, a first motor 64a which is a rotating mechanism is supported on the column 48. On a first motor shaft 66a of the first motor 64a, a first gear 68a is provided, and this first gear 68a engages the above-described first teeth portion 62a.

The first piston housing 46a forms a first cylinder. That is, a first fluid chamber 72a is formed in the first piston housing 46a and a first piston 74a is housed in the first fluid chamber 72a in a displaceable manner. A hydraulic fluid as a pressure fluid is supplied to or discharged from the first fluid chamber 72a. As described above, the first cylinder is a hydraulic cylinder.

When the first piston 74a is located at the forward end (the bottom dead center), the tip of the first piston 74a is in contact with the upper end face of the first spindle 34a. As a result, a pressing force is applied to the first spindle 34a from the first piston 74a.

The second spindle 34b and the second piston housing 46b are similar in structure to the first spindle 34a and the first piston housing 46a. That is, in the second spindle 34b, a second receiving portion 52b, in which a second insertion concave portion 54b is formed, is formed so as to protrude therefrom and a second guide rail 56b is provided. A second cam follower 58b, which is pivotally supported on a bearing (not depicted in the drawing) provided in the second piston housing 46b, engages the second guide rail 56b.

Moreover, in an outer peripheral part of the second piston housing 46b, a second fan-shaped portion 60b having a second teeth portion 62b is formed so as to protrude therefrom. A second gear 68b provided in a second motor shaft 66b of a second motor 64b, which is a rotating mechanism, engages the second teeth portion 62b. Furthermore, in the second piston housing 46b, a second fluid chamber 72b in which a second piston 74b is housed in a displaceable manner is formed. A hydraulic fluid is supplied to or discharged from the second fluid chamber 72b. As a result, a second cylinder is constructed.

The remaining third spindle 34c and fourth spindle 34d are also similar in structure to the first spindle 34a. Likewise, the third piston housing 46c and the fourth piston housing 46d are also similar in structure to the first piston housing 46a. Therefore, to the component elements related to the third spindle 34c and the third piston housing 46c, "third" is attached in place of "first" of the component elements related to the first spindle 34a and the first piston housing 46a and "c" is attached in place of the suffix "a" of the reference numerals, and the detailed descriptions thereof will be omitted. Likewise, to the component elements related to the fourth spindle 34d and the fourth piston housing 46d, "fourth" is attached to the component elements and "d" is attached to the reference numerals as a suffix, and the detailed descriptions thereof will be omitted.

As depicted in FIG. 2, in the lower bottom of the first spindle 34a, a flange portion 80 protruding outward in the direction of the diameter is formed. The above-described first receiving portion 52a is provided in the flange portion 80 in an outermost part thereof in the direction of the diameter. Meanwhile, in the lower bottom of the fourth spindle 34d, a flange portion 82 protruding inward in the direction of the diameter is formed. A fourth receiving portion 52d is provided in the flange portion 82 in an innermost part thereof in the direction of the diameter. The second receiving portion 52b of the second spindle 34b and a third receiving portion 52c of the third spindle 34c are passed through a space formed between the first receiving portion 52a and the fourth receiving portion 52d. Thus, the first to fourth receiving portions 52a to 52d (the first to fourth insertion concave portions 54a to 54d) are close to each other. Moreover, the radii of the first fan-shaped portion 60a, the second fan-shaped portion 60b, a third fan-shaped portion 60c, and a fourth fan-shaped portion 60d decrease in this order.

The stator production apparatus 30 further includes a plurality of receiving jigs (none of which is depicted in the drawing), each receiving the other linear portion of the segment 10 whose one linear portion is inserted into one of the first to fourth insertion concave portions 54a to 54d. That is, for example, when the first linear portion 12 of one segment 10 is inserted into the first insertion concave portion 54a, the second linear portion 14 is inserted into an insertion concave portion of the receiving jig, not into one of the second to fourth insertion concave portions 54b to 54d.

When the linear portion is displaced in the direction of the axis thereof, the receiving jig is pressed by the linear portion. As a result, the receiving jig is displaced integrally with the linear portion.

The stator production apparatus 30 according to the first embodiment is basically constructed as described above; next, the workings and effects thereof will be described in connection with a method for producing a stator.

To obtain a stator, first, the first linear portion 12 and the second linear portion 14 of one segment 10 are individually inserted into two different slots of the plurality of slots provided in the stator core 20. The above operation is repeated and insertion of a predetermined number of segments 10 into the slots is completed. It goes without saying that a plurality of segments may be inserted into the slots all at once.

Next, the stator core 20 is placed on the placement board 36 in such a way as to obtain an inverted position in which the turn portions 16 face downward and the first linear portions 12 and the second linear portions 14 face upward. At this time, the turn portions 16 make contact with the upper end face of the placement board 36 and the convex portion 42 of the holding jig 40 is inserted into the concave portion 44 of the stator core 20. As a result, the stator core 20 is prevented from rotating and positioned and fixed, and enters a state depicted in FIG. 2.

At this point in time, the first to fourth pistons 74a to 74d are located at the bottom dead centers and in contact with the first to fourth spindles 34a to 34d. Therefore, a pressing force is applied to the first to fourth spindles 34a to 34d from the first to fourth pistons 74a to 74d.

Figure 3:
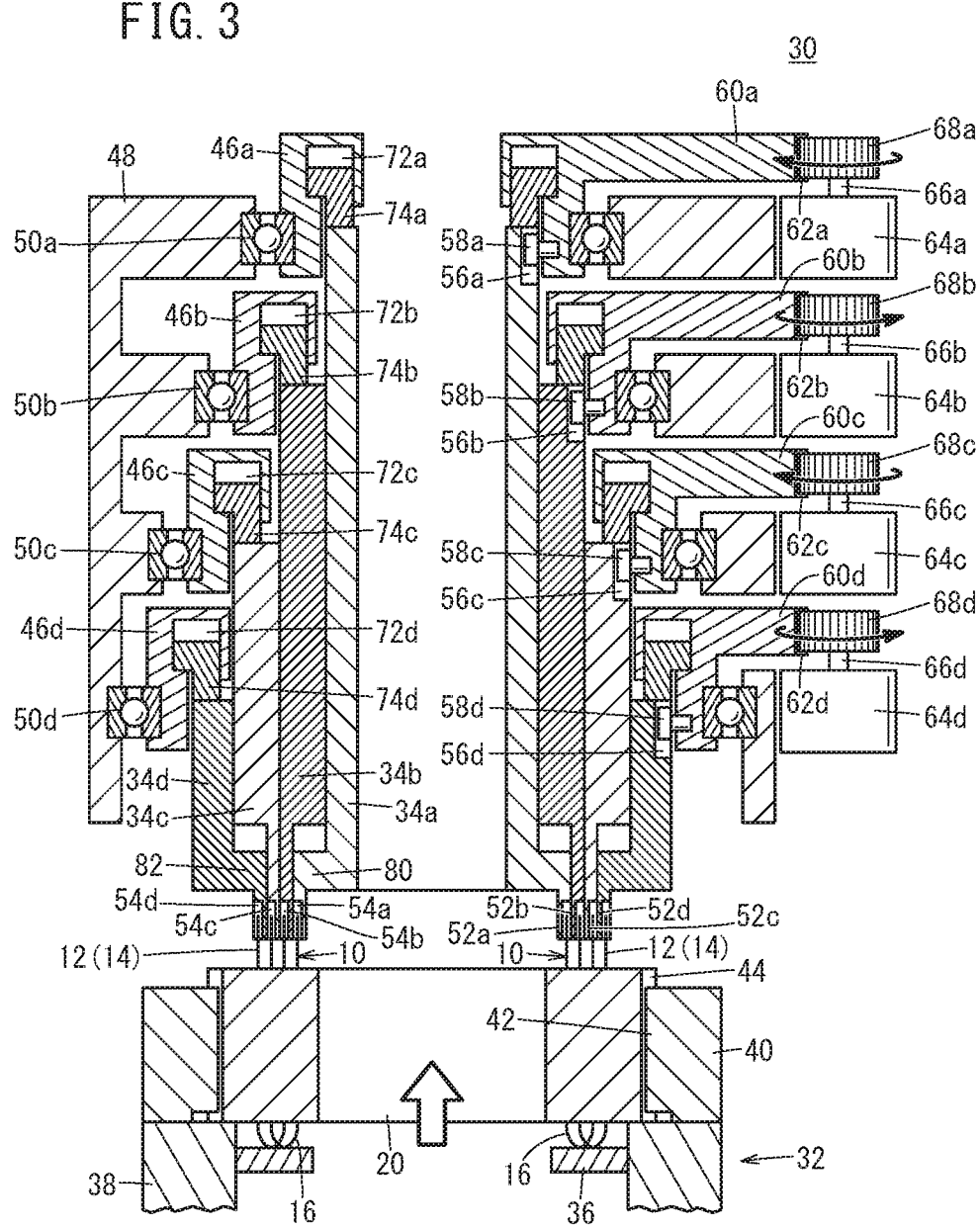
FIG. 3 is a longitudinal sectional view of the principal portions, the longitudinal sectional view depicting a state where a stator core moves upward and linear portions are inserted into insertion concave portions of spindles (twisting and bending jigs)

Next, the lifting and lowering platform 32 is moved upward by the action of the above-described lifting and lowering mechanism. As a result, the stator core 20 moves upward with the lifting and lowering platform 32 as depicted in FIG. 3. After this, the lifting and lowering platform 32 and the stator core 20 continue moving upward at a predetermined speed while at least one of the first to fourth spindles 34a to 34d is rotated.

As a result of the stator core 20 moving upward, one of the linear portions of each of the plurality of segments 10 enters one of the first to fourth insertion concave portions 54a to 54d. Of the linear portions protruding from the slot, the linear portion located in the innermost peripheral first layer is inserted into the first insertion concave portion 54a and the linear portion protruding from the second layer from the inner peripheral side is inserted into the second insertion concave portion 54b. Likewise, the linear portions protruding from the third layer and the fourth layer from the inner peripheral side are inserted into the third insertion concave portion 54c and the fourth insertion concave portion 54d, respectively. Moreover, the other linear portion of each segment 10 is inserted into the insertion concave portion of the unillustrated receiving jig described above.

As described earlier, the first to fourth pistons 74a to 74d are in contact with the first to fourth spindles 34a to 34d, respectively. As a result, movements of the first to fourth spindles 34a to 34d in the height direction of the stator core 20 (in the direction of the axis of the linear portion) are restricted. That is, the first to fourth pistons 74a to 74d function as stoppers that restrict movements of the first to fourth spindles 34a to 34d.

In this state, all of the first to fourth motors 64a to 64d are actuated and all of the first to fourth motor shafts 66a to 66d rotate at a predetermined angle. The first to fourth gears 68a to 68d follow this and rotate at a predetermined angle, and the first to fourth piston housings 46a to 46d also rotate. This is because the first to fourth gears 68a to 68d engage the first to fourth teeth portions 62a to 62d.

The first to fourth piston housings 46a to 46d are coupled to the first to fourth spindles 34a to 34d, respectively, via the engagement between the first to fourth cam followers 58a to 58d and the first to fourth guide rails 56a to 56d. As a result, the first to fourth spindles 34a to 34d also rotate following the rotation of the first to fourth piston housings 46a to 46d.

In this case, the direction of rotation of the first motor shaft 66a and the third motor shaft 66c is set so as to be opposite to the direction of rotation of the second motor shaft 66b and the fourth motor shaft 66d, for example. That is, if the first motor shaft 66a and the third motor shaft 66c rotate in a clockwise direction, the second motor shaft 66b and the fourth motor shaft 66d rotate in a counterclockwise direction. As a result, the segments 10 whose linear portions are inserted into the innermost peripheral first layer (the first insertion concave portion 54a) and the third layer from the innermost periphery (the third insertion concave portion 54c) and the segments 10 whose linear portions are inserted into the second layer from the innermost periphery (the second insertion concave portion 54b) and the fourth layer from the innermost periphery (the fourth insertion concave portion 54d) are twisted in opposite directions.

As described earlier, the stator core 20 continues slowly moving upward. Thus, the segments 10 are twisted so as to be inclined by the upward movement and rotation.

If the segment 10 whose linear portion is inserted into the fourth layer from the innermost periphery is further twisted, the linear portion moves greatly in the circling direction as compared to the linear portions of the first to third layers on the inner peripheral side. In this case, the amount of protrusion of the linear portion of the fourth layer closer to the outer peripheral side than the first to third layers becomes small. To avoid such an inconvenience, the rotation of the fourth piston housing 46d is stopped and the first piston housing 46a, the second piston housing 46b, and the third piston housing 46c are rotated.

Figure 4:
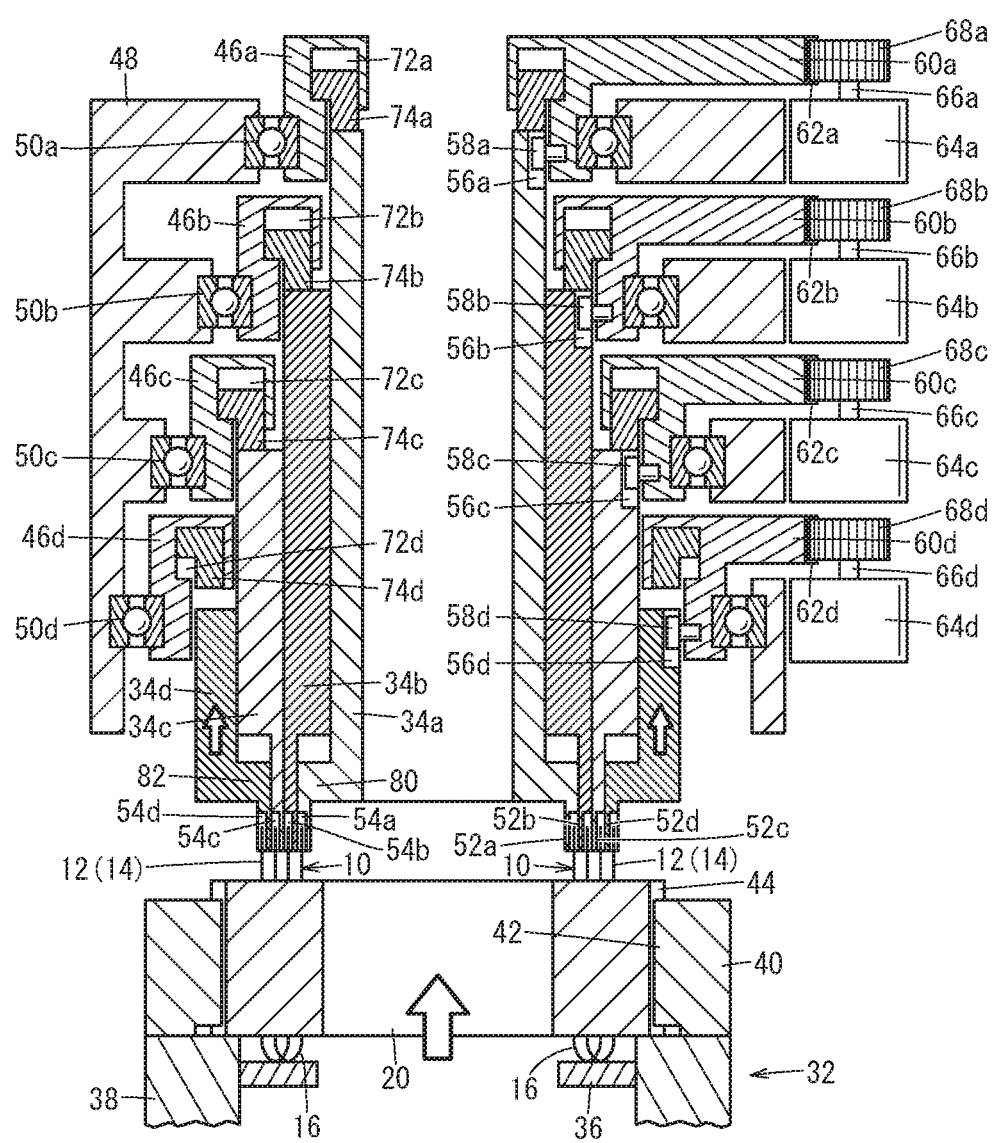
FIG. 4 is a longitudinal sectional view of the principal portions when a piston (a stopper) restricting displacement of an outermost peripheral spindle moves upward and the spindle enters a floating-supported state.

In order to do this, the fourth piston 74d is moved upward as depicted in FIG. 4. As a result, the fourth spindle 34d is released from the pressing force of the fourth piston 74d. That is, the fourth piston 74d stops functioning as the stopper and the fourth spindle 34d enters a floating-supported state. The fourth piston 74d is eventually located at the backward end (the top dead center). It goes without saying that, when the fourth piston 74d moves upward, the hydraulic fluid is discharged from a fourth fluid chamber 72d.

Since the lifting and lowering platform 32 and the stator core 20 continue moving upward, the segments 10 follow this movement and also move upward. That is, the linear portions are displaced upward. As a result, the fourth spindle 34d and the receiving jig are pressed by the linear portions. Since the fourth piston 74d already stops functioning as the stopper, the fourth spindle 34d and the receiving jig are displaced upward by being pressed by the linear portions. At this time, the fourth spindle 34d is guided by the fourth cam follower 58d engaging the fourth guide rail 56d.

Figure 5:
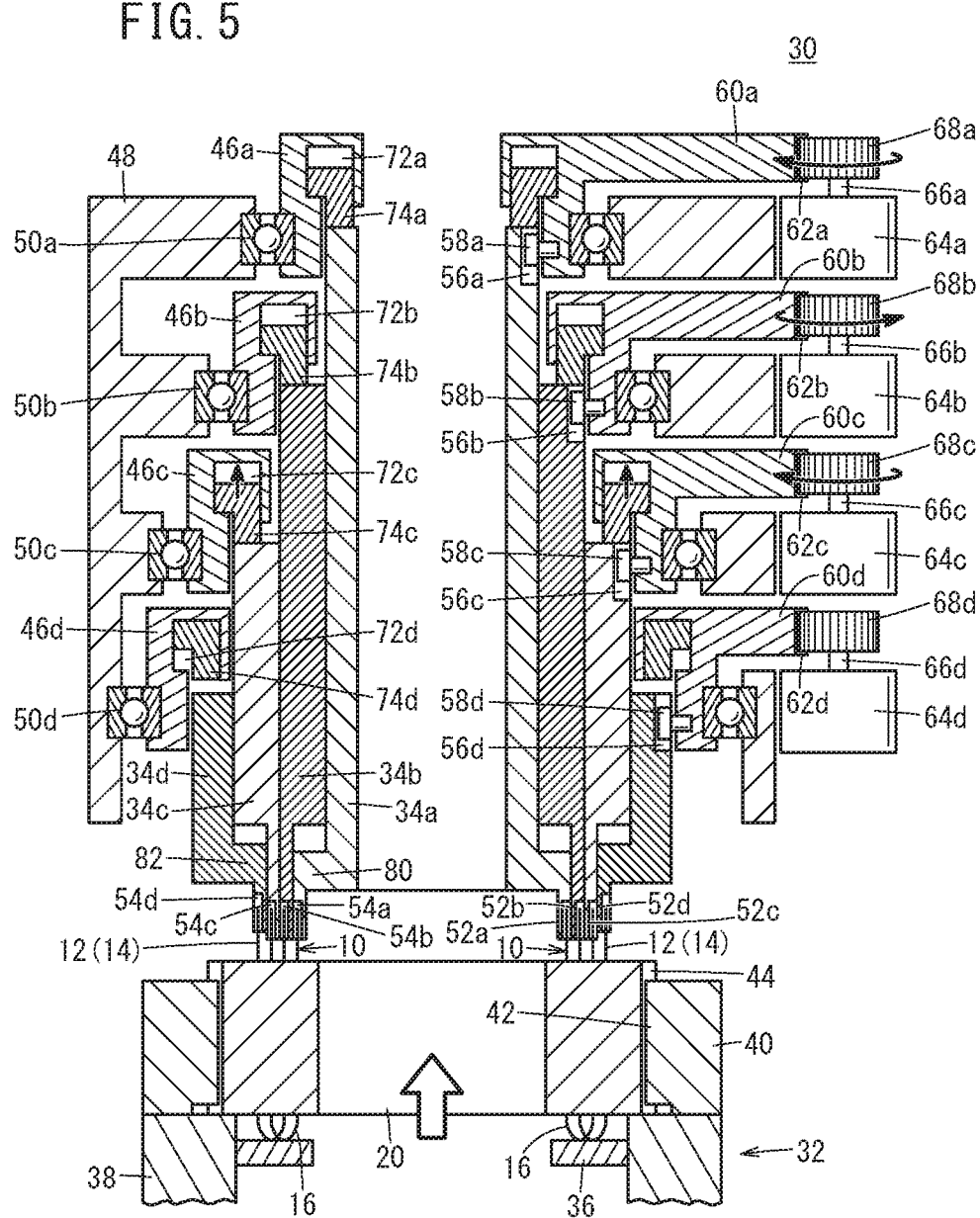
FIG. 5 is a longitudinal sectional view of the principal portions, the longitudinal sectional view depicting a state where the outermost peripheral spindle moves upward.

As a result of the above-described operations having being performed, as depicted in FIG. 5, the fourth spindle 34d (the fourth receiving portion 52d) is at a relatively higher level than the first to third spindles 34a to 34c (the first to third receiving portions 52a to 52c).

In this state, the first to third motor shafts 66a to 66c further rotate at a predetermined angle by the action of the first to third motors 64a to 64c. The first to third gears 68a to 68c follow this and rotate at a predetermined angle, and, in addition thereto, the first to third piston housings 46a to 46c also rotate. As a result, the first to third spindles 34a to 34c also rotate. The direction of rotation of the first motor shaft 66a and the third motor shaft 66c is set so as to be the same as that described above and opposite to the direction of rotation of the second motor shaft 66b. As a result, the segments 10 of the first and third layers from the inner peripheral side and the segment 10 of the second layer are twisted in opposite directions.

Figure 6:
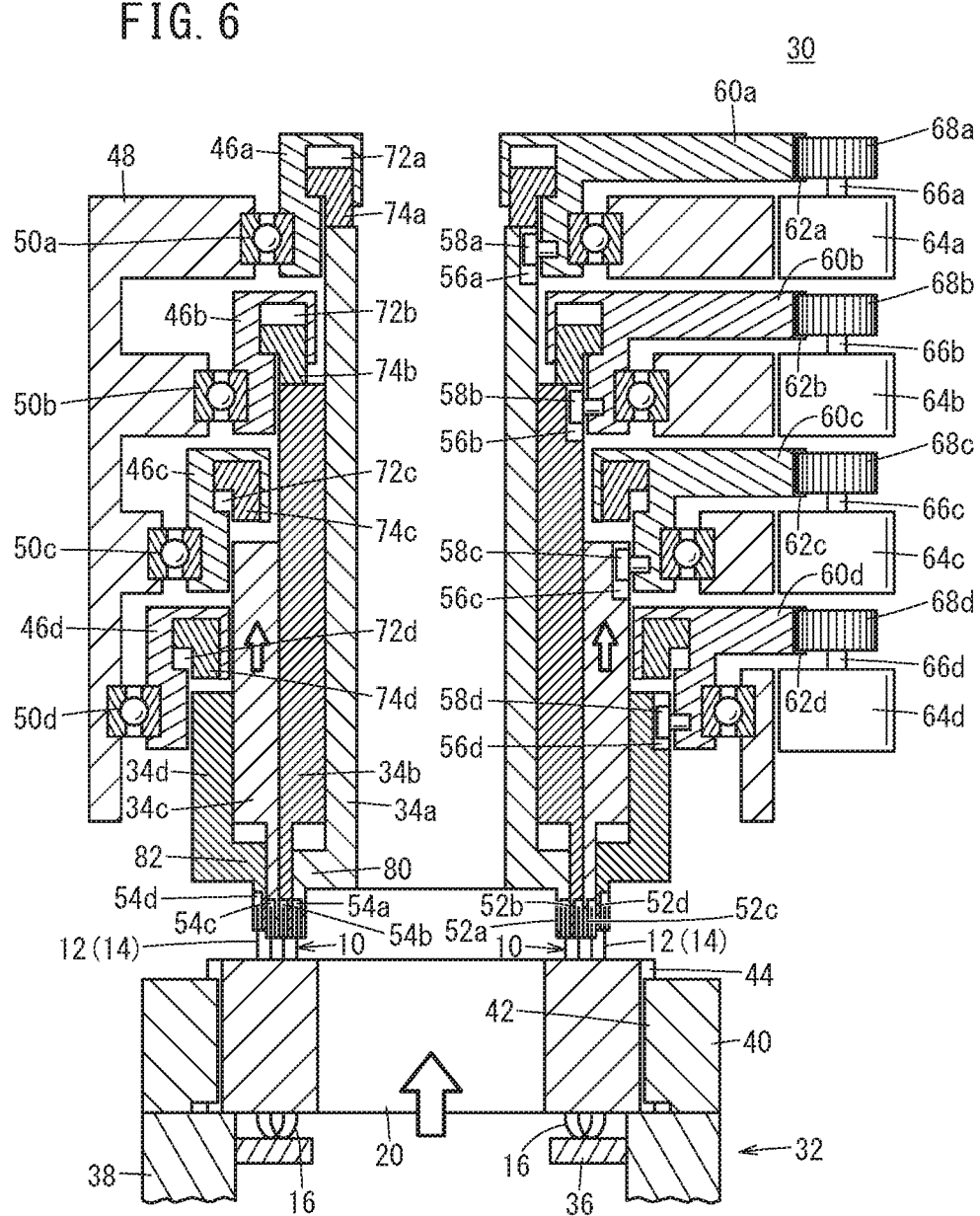
FIG. 6 is a longitudinal sectional view of the principal portions when a piston restricting displacement of a spindle located next to the outermost peripheral spindle in an inward direction moves upward and the spindle enters a floating-supported state.

Next, the segments 10 of the first and second layers from the inner peripheral side are further twisted. In order to do this, the hydraulic fluid is discharged from a third fluid chamber 72c and the third piston 74c is moved upward (backward) so as to be located at the top dead center as depicted in FIG. 6. As a result, the third piston 74c releases the third spindle 34c and stops functioning as the stopper.

Figure 7:
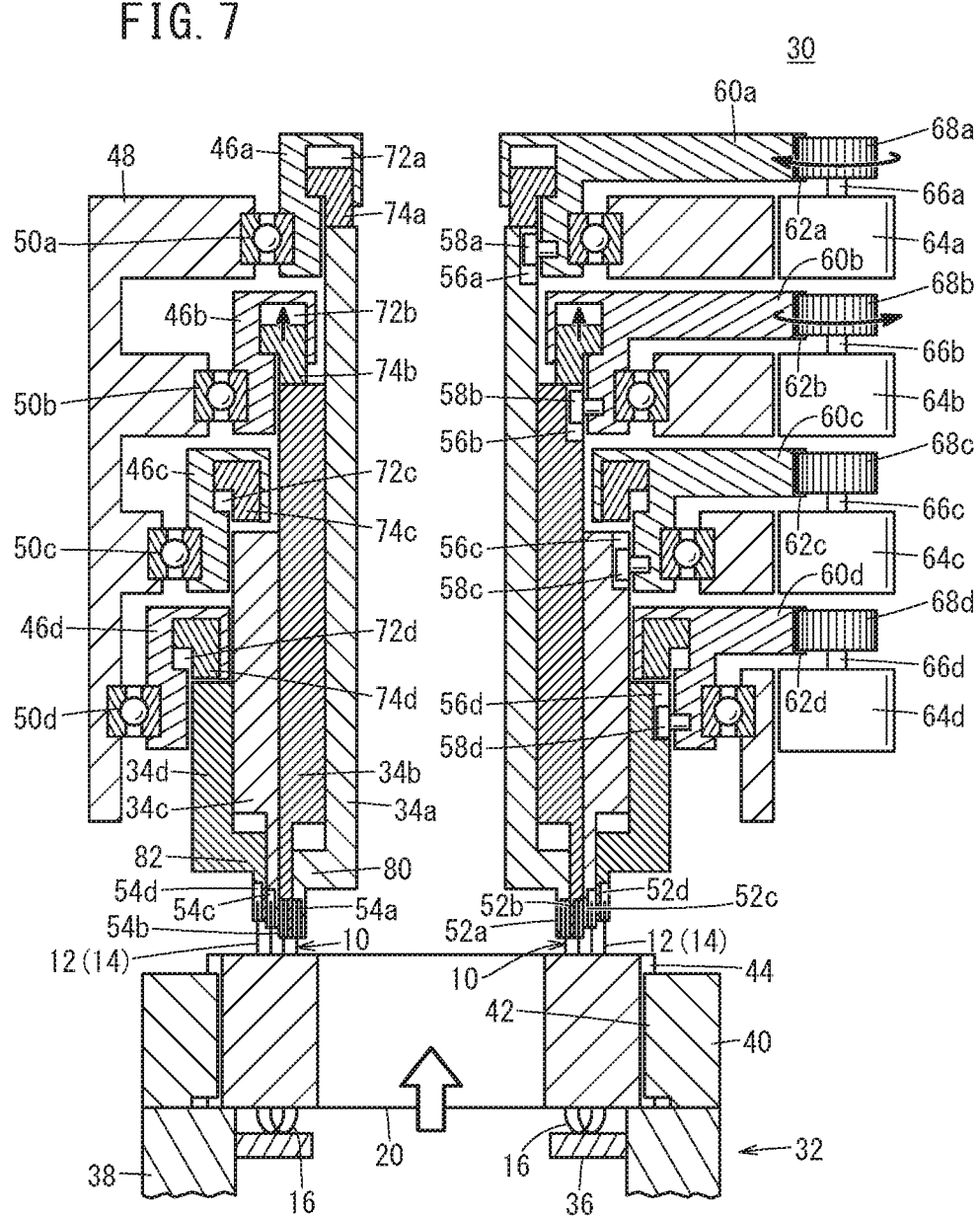
FIG. 7 is a longitudinal sectional view of the principal portions, the longitudinal sectional view depicting a state where the spindle located next to the outermost peripheral spindle in the inward direction moves upward.

Since the lifting and lowering platform 32 and the stator core 20 continue moving upward, the third spindle 34c and the receiving jig are pressed by the linear portions and displaced upward. At this time, the third spindle 34c is guided by the third cam follower 58c engaging the third guide rail 56c. As a result, as depicted in FIG. 7, the third receiving portion 52c is at a relatively higher level than the first receiving portion 52a and the second receiving portion 52b. The fourth spindle 34d remains at the higher level.

In this state, the first motor shaft 66a and the second motor shaft 66b further rotate at a predetermined angle by the action of the first motor 64a and the second motor 64b. The first gear 68a and the second gear 68b follow this and rotate at a predetermined angle, and, in addition thereto, as a result of the first piston housing 46a and the second piston housing 46b following this and rotating, the first spindle 34a and the second spindle 34b rotate. As in the case of the above description, the direction of rotation of the first motor shaft 66a is the same direction as before and opposite to the direction of rotation of the second motor shaft 66b. As a result, the (innermost peripheral) segment 10 of the first layer from the inner peripheral side and the segment 10 of the second layer are twisted in opposite directions.

Figure 8:
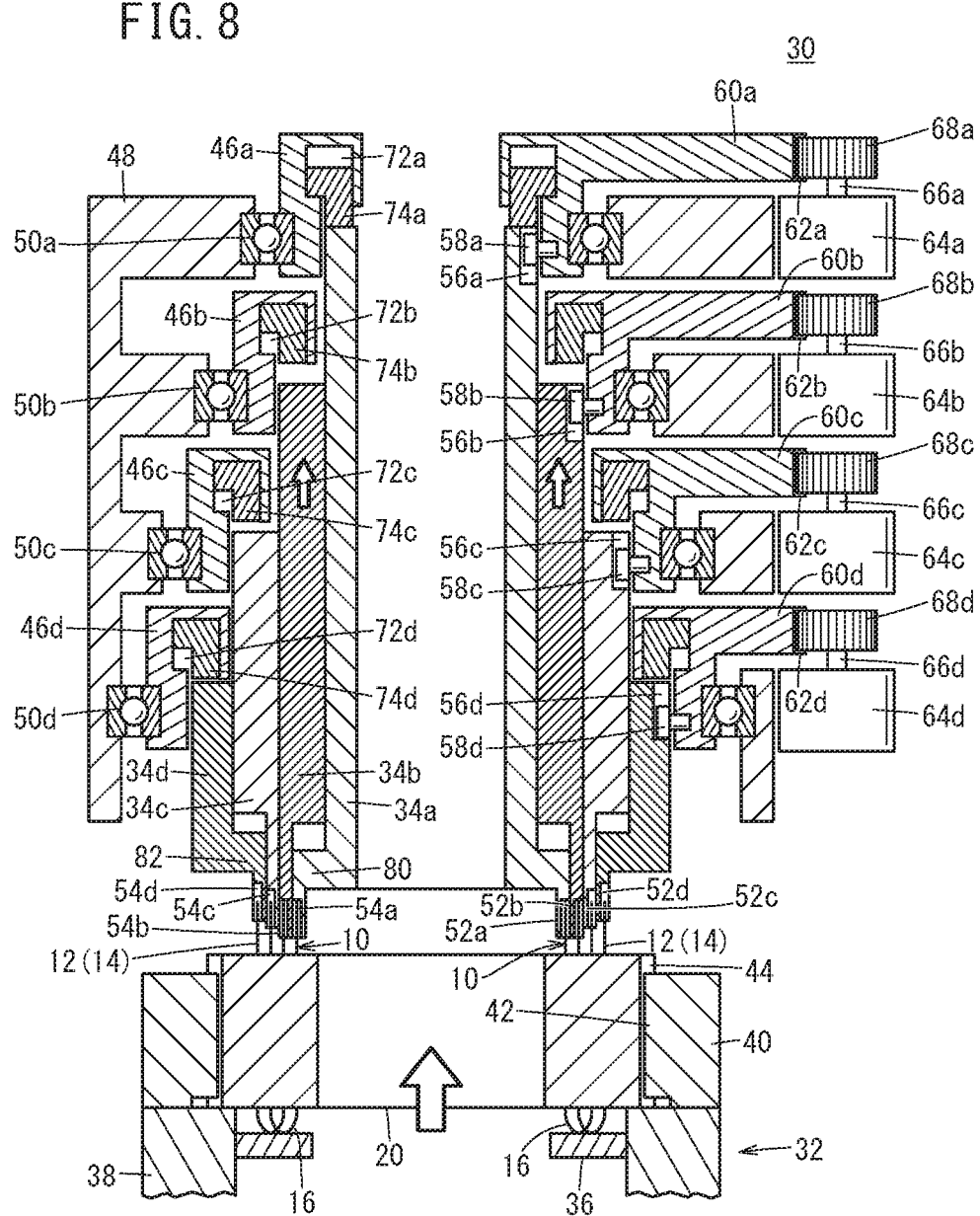
FIG. 8 is a longitudinal sectional view of the principal portions when a piston restricting displacement of a spindle located next to the spindle next to the outermost peripheral spindle in the inward direction (a spindle located next to an innermost peripheral spindle in an outward direction) moves upward and the spindle enters a floating-supported state.

Next, only the (innermost peripheral) segment 10 of the first layer from the inner peripheral side is further twisted. In order to do this, the hydraulic fluid is discharged from the second fluid chamber 72b and the second piston 74b is moved upward so as to be located at the top dead center as depicted in FIG. 8. As a result, the second piston 74b releases the second spindle 34b and stops functioning as the stopper.

Figure 9:
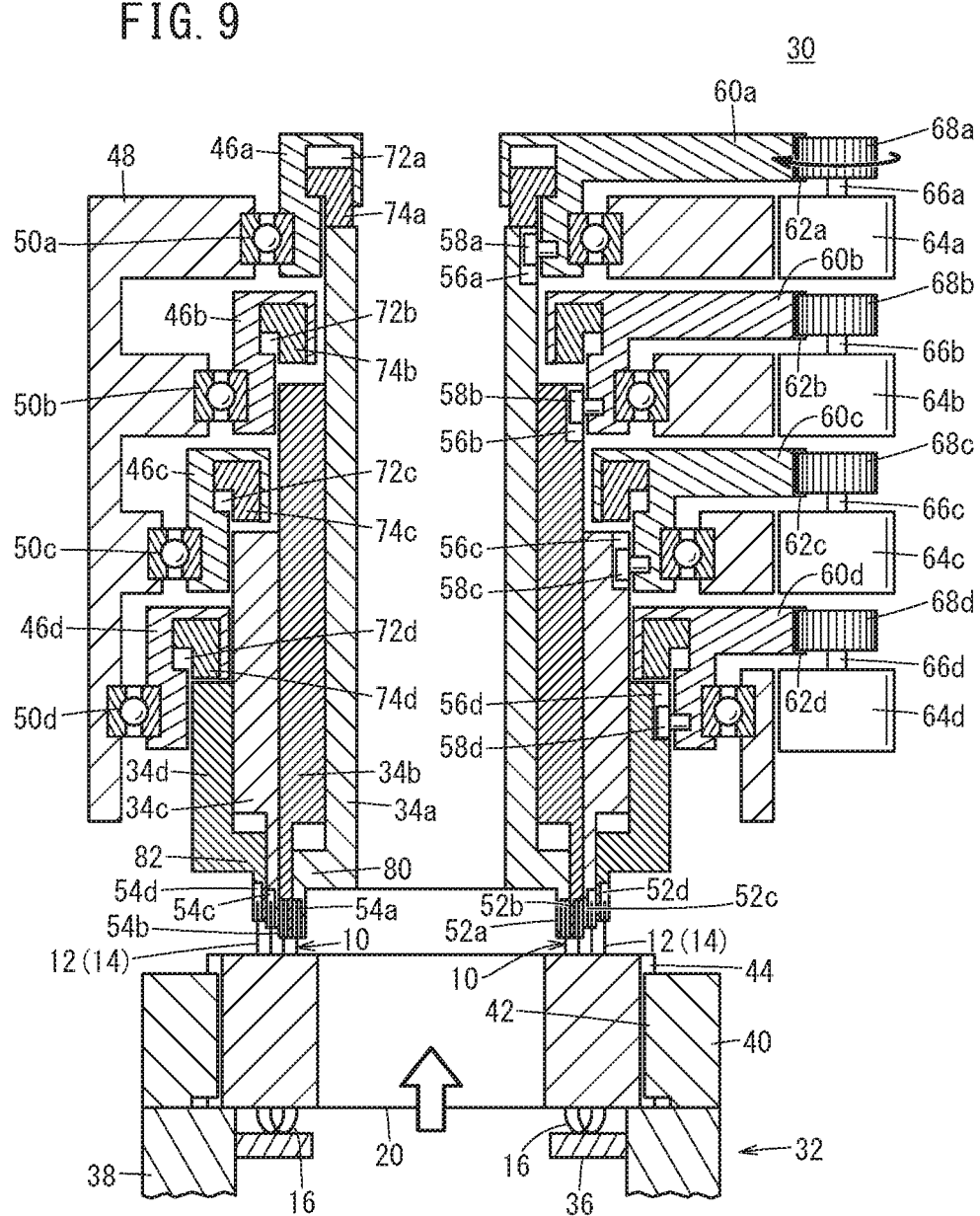
FIG. 9 is a longitudinal sectional view of the principal portions, the longitudinal sectional view depicting a state where the spindle located next to the spindle next to the outermost peripheral spindle in the inward direction (the spindle located next to the innermost peripheral spindle in the outward direction) moves upward.

Consequently, the second spindle 34b and the receiving jig are pressed by the linear portions moving upward and are displaced upward. At this time, the second spindle 34b is guided by the second cam follower 58b engaging the second guide rail 56b. As a result, as depicted in FIG. 9, the second receiving portion 52b is at a relatively higher level than the first receiving portion 52a. The third spindle 34c and the fourth spindle 34d each remain at the higher level.

Furthermore, the first motor shaft 66a rotates at a predetermined angle by the action of the first motor 64a. The first gear 68a follows this and rotates at a predetermined angle, and the first piston housing 46a follows this and rotates. This makes the first spindle 34a rotate in the same direction as in the above-described operations. As a result, the innermost peripheral segment 10 is twisted.

By the above twisting and bending, all the ends of the segments 10 are twisted and bent. In addition thereto, since the segment 10 on the inner peripheral side is twisted after putting the segments 10 on the outer peripheral side, which were subjected to forming, into a state where they cannot rotate by sequentially releasing them from pressing by the spindles, a situation in which the length of a protrusion of the linear portion from the slot in the segment 10 on the outer peripheral side becomes small is avoided.

That is, according to the first embodiment, even with the segments 10 of the same shape and size, it is possible to make the lengths of protrusions of the linear portions thereof from the slot coincide with each other. As a result, the segments 10 of the same shape and size only have to be prepared. In other words, producing a plurality of types of segments with the first linear portions 12 or the second linear portions 14 having different lengths becomes unnecessary. Thus, it is also not necessary to produce a plurality of types of molds to obtain segments with different sizes. This makes it possible to avoid an increase in cost.

In addition thereto, if the lengths of the first linear portions 12 or the second linear portions 14 are different, it is necessary to arrange the segments in order; in the first embodiment, since the segments 10 have the same shape and size, there is no need to specify the order in which the segments 10 are arranged. That is, it is possible to insert the segments 10, which were randomly picked out, into the slots as appropriate. Moreover, it is also not necessary to make the neutral lines used for twisting and bending of the segments 10 vary from layer to layer. For these reasons described above, the segments 10 can be inserted into the slots with ease. This makes it possible to improve stator production efficiency.

Figure 10:
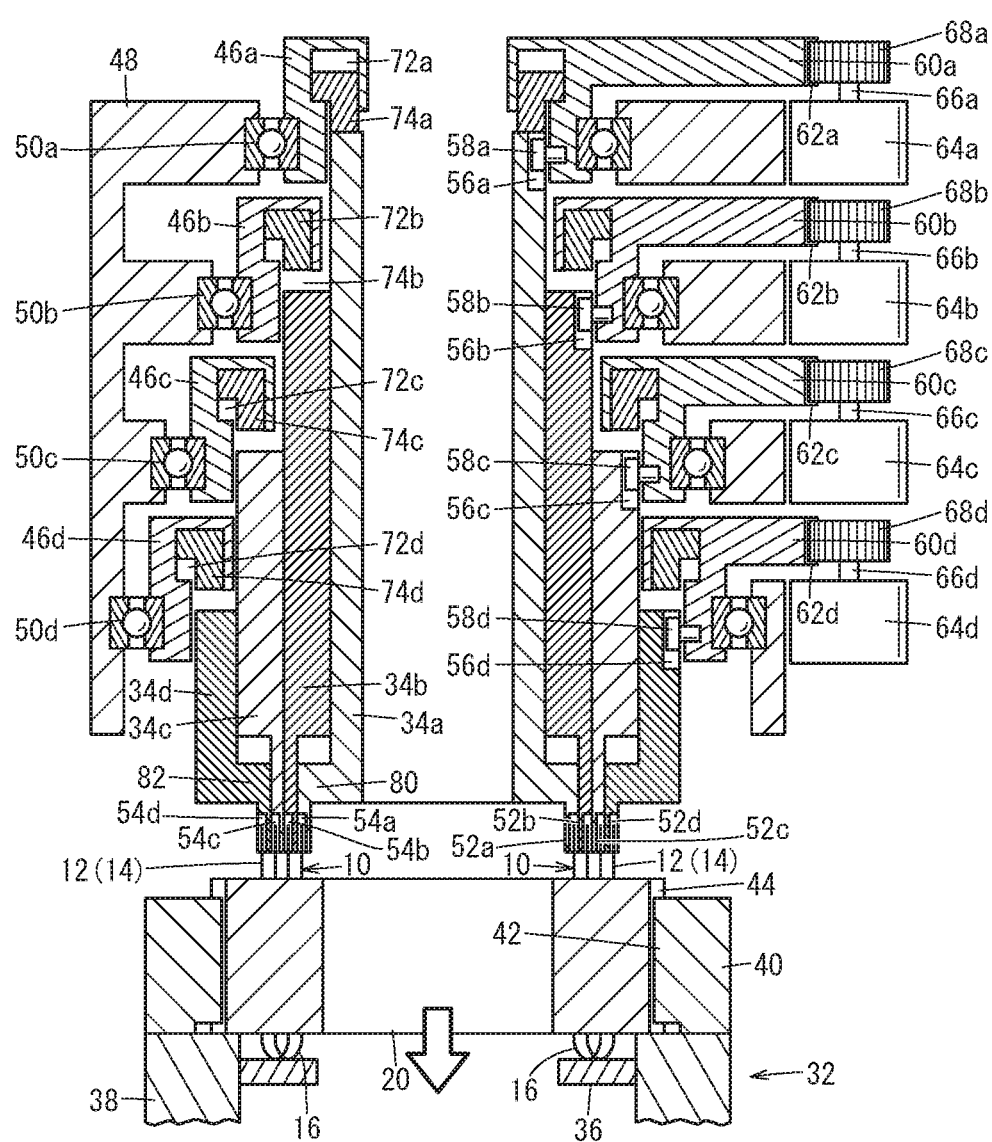
FIG. 10 is a longitudinal sectional view of the principal portions, the longitudinal sectional view depicting a state where the stator core starts moving downward.

Then, by the action of the unillustrated lifting and lowering mechanism, as depicted in FIG. 10, the stator core 20 starts moving downward with the base 38. As a result, the linear portions are exposed. Furthermore, as a result of the exposed linear portions being joined together, an electrical path is formed between the segments 10. As a result, a stator with an electromagnetic coil formed of the coupled segments 10 is obtained.

The directions of rotation of the first to fourth spindles 34a to 34d are not particularly limited to those described above and may be the same direction.

Next, a stator production apparatus 100 according to a second embodiment will be described with reference to FIGS. 11 to 17.

Figure 11:
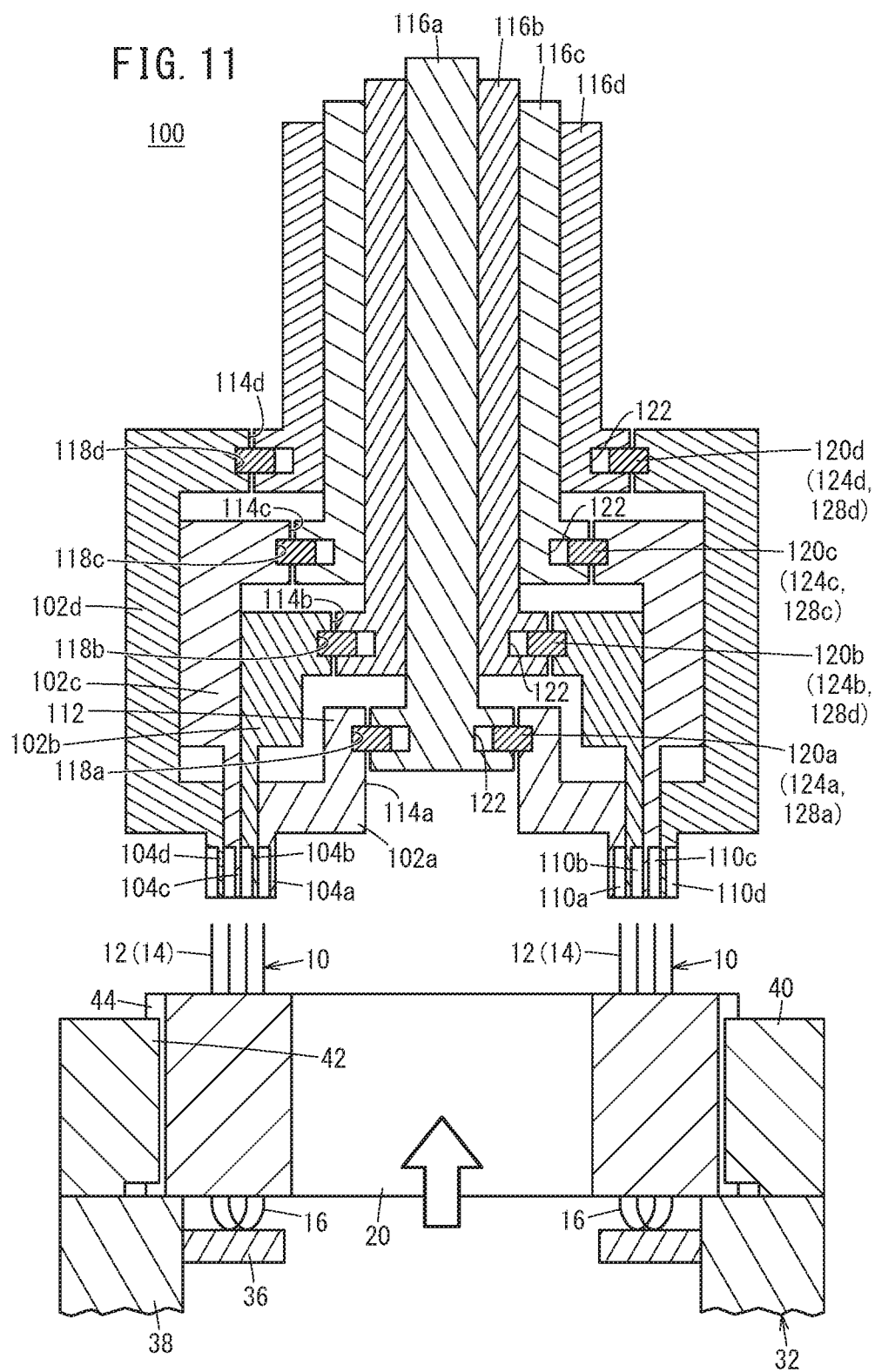
FIG. 11 is a longitudinal sectional view of principal portions of a stator production apparatus according to a second embodiment of the present invention.

As depicted in FIG. 11, this stator production apparatus 100 includes a lifting and lowering platform 32 that moves the stator core 20 upward and downward and first to fourth spindles 102a to 102d which are twisting and bending jigs for twisting the segments 10 while grasping the linear portions inserted into the slots of the stator core 20. Since the structure of the placement board 36 is the same as that of the first embodiment, the component elements are identified with the same reference numerals and the detailed descriptions thereof will be omitted.

The first to fourth spindles 102a to 102d each have a substantially cylindrical shape with an opening in part of a lower end and part of an upper end. In receiving portions 104a to 104d which are protruding lower ends of the first to fourth spindles 102a to 102d, first to fourth insertion concave portions 110a to 110d are respectively formed.

Figure 12:
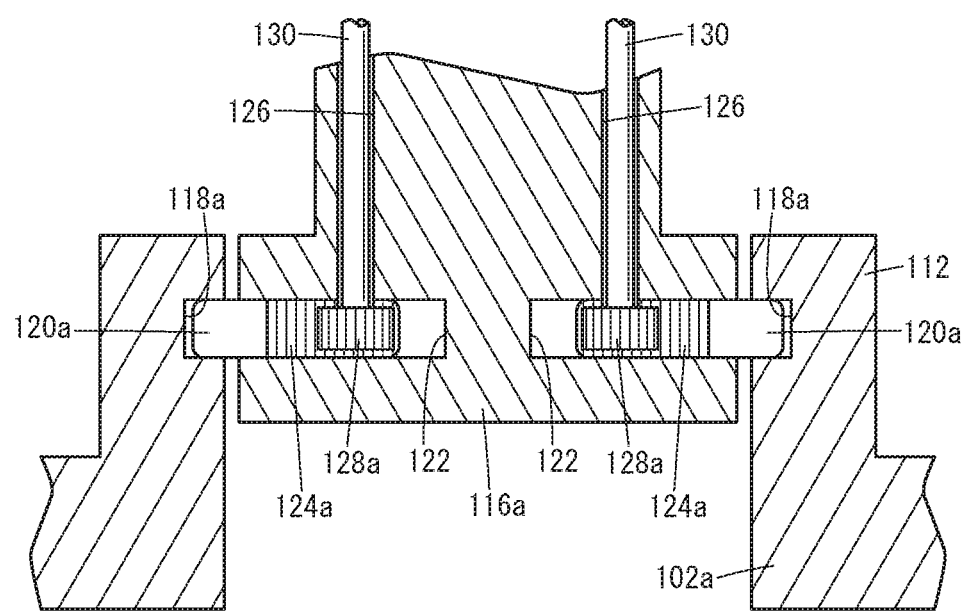
FIG. 12 is a longitudinal sectional view of the principal portions, the longitudinal sectional view depicting a state where a spindle located on the innermost periphery and a rotary shaft which is inserted into the spindle are coupled by engaging pins.

In the ceiling wall of the first spindle 102a, a cylindrical convex portion 112 is formed so as to protrude therefrom. In this cylindrical convex portion 112, a first insertion opening 114a is formed so as to pass therethrough, and a solid first rotary shaft 116a is inserted into the first insertion opening 114a. As depicted in FIG. 12 showing an enlarged area near the cylindrical convex portion 112, a plurality of first engagement holes 118a are formed in the inner wall of the cylindrical convex portion 112.

Meanwhile, in the first rotary shaft 116a, slightly long first engaging pins 120a (stoppers) are provided in positions facing the first engagement holes 118a. The first engaging pins 120a are slidably housed in housing holes 122 bored in the direction of the diameter of the first insertion opening 114a. Moreover, in the side wall of each first engaging pin 120a, a first rack 124a is formed.

In the first rotary shaft 116a, insertion holes 126 are provided in the direction of the axis of the first rotary shaft 116a. A rotating shaft 130 having a first pinion 128a at the tip thereof is placed through each insertion hole 126. The first pinions 128a engage the first racks 124a; therefore, the first engaging pins 120a move forward or backward (move in a straight line) with the rotation of the rotating shafts 130 and the first pinions 128a. The rotating shafts 130 are not depicted in FIG. 11 and FIGS. 13 to 17.

When the first engaging pins 120a move forward and engage the first engagement holes 118a, the first rotary shaft 116a is coupled to the first spindle 102a via the first engaging pins 120a. In this case, the rotational movement of the first rotary shaft 116a is transferred to the first spindle 102a via the first engaging pins 120a. That is, when the first rotary shaft 116a rotates, the first spindle 102a follows this and rotates.

As depicted in FIG. 11, also in the second to fourth spindles 102b to 102d, second to fourth insertion openings 114b to 114d are formed in the ceiling walls thereof so as to pass therethrough, and second to fourth rotary shafts 116b to 116d are inserted into the second to fourth insertion openings 114b to 114d, respectively. Here, the second to fourth rotary shafts 116b to 116d are formed as hollow shafts. Then, the third rotary shaft 116c is passed through the hollow of the fourth rotary shaft 116d, and the second rotary shaft 116b is passed through the hollow of the third rotary shaft 116c. Furthermore, the first rotary shaft 116a is passed through the hollow of the second rotary shaft 116b.

In the second to fourth spindles 102b to 102d, second to fourth engagement holes 118b to 118d are formed, and, in the second to fourth rotary shafts 116b to 116d, second to fourth engaging pins 120b to 120d are provided in positions facing the second to fourth engagement holes 118b to 118d and are housed in the housing holes 122. As is the case with the above description, second to fourth racks 124b to 124d are engraved in the second to fourth engaging pins 120b to 120d and second to fourth pinions 128b to 128d provided in the rotating shafts 130 (not depicted in the drawing) engage the second to fourth racks 124b to 124d. When the rotating shafts 130 and the second to fourth pinions 128b to 128d rotate, the second to fourth engaging pins 120b to 120d follow this and move forward or backward (move in a straight line).

In the above structure, in the first to fourth rotary shafts 116a to 116d, unillustrated rotating and driving mechanisms (rotating mechanisms) are individually provided. This allows the first to fourth rotary shafts 116a to 116d to rotate independently.

Moreover, the first to fourth rotary shafts 116a to 116d and the rotating and driving mechanisms are supported by an unillustrated supporting board. Furthermore, the supporting board can move upward and downward by the action of an unillustrated second lifting and lowering mechanism. With the upward or downward movement of the supporting board, the first to fourth rotary shafts 116a to 116d also move upward or downward.

Next, an operation of the stator production apparatus 100 according to the second embodiment will be described.

First, after the linear portions of the segments 10 are inserted into the slots of the stator core 20 in a manner similar to the first embodiment, the stator core 20 is placed on the placement board 36 in an inverted position in which the turn portions 16 face downward and the first linear portions 12 and the second linear portions 14 face upward. At this time, the convex portion 42 of the holding jig 40 is inserted into the concave portion 44 of the stator core 20 to prevent the stator core 20 from rotating.

At this point in time, the first to fourth engaging pins 120a to 120d are located at the forward ends and enter the first to fourth engagement holes 118a to 118d. In other words, the first to fourth engaging pins 120a to 120d engage the first to fourth engagement holes 118a to 118d. As a result, the first to fourth spindles 102a to 102d are coupled to the first to fourth rotary shafts 116a to 116d via the first to fourth engaging pins 120a to 120d.

Figure 13:
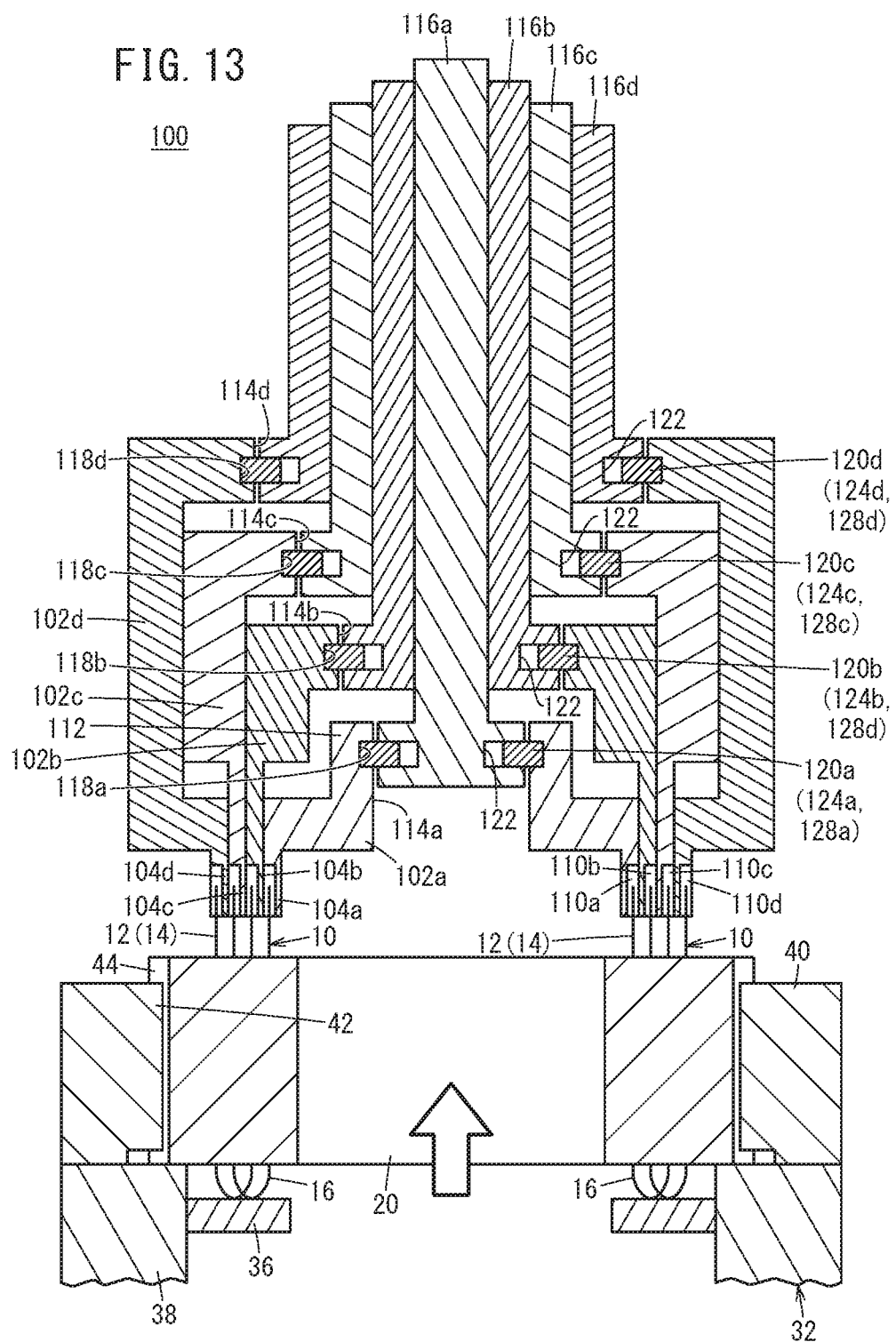
FIG. 13 is a longitudinal sectional view of the principal portions, the longitudinal sectional view depicting a state where a stator core moves upward and linear portions are inserted into insertion concave portions of the spindles.

Next, the lifting and lowering platform 32 is moved upward by the action of the lifting and lowering mechanism. As a result, the stator core 20 moves upward with the lifting and lowering platform 32 as depicted in FIG. 13. Then, as in the case of the first embodiment, the lifting and lowering platform 32 and the stator core 20 continue moving upward at a predetermined speed while at least one of the first to fourth spindles 102a to 102d is rotated.

As a result of the stator core 20 moving upward, a linear portion of a plurality of segments 10, the linear portion of the first layer located on the innermost periphery, is inserted into the first insertion concave portion 110a and a linear portion of the second layer from the inner peripheral side is inserted into the second insertion concave portion 110b. Likewise, linear portions of the third layer and the fourth layer from the inner peripheral side are inserted into the third insertion concave portion 110c and the fourth insertion concave portion 110d, respectively. Moreover, the other linear portion of each segment 10 is inserted into an insertion concave portion of an unillustrated receiving jig.

The first to fourth spindles 102a to 102d are coupled to the first to fourth rotary shafts 116a to 116d as described above. This causes the first to fourth spindles 102a to 102d to be positioned and fixed, whereby the movements thereof in the height direction of the stator core 20 (the direction of the axis of the linear portion) are restricted. That is, the first to fourth engaging pins 120a to 120d restrict the movements of the first to fourth spindles 102a to 102d.

Figure 14:
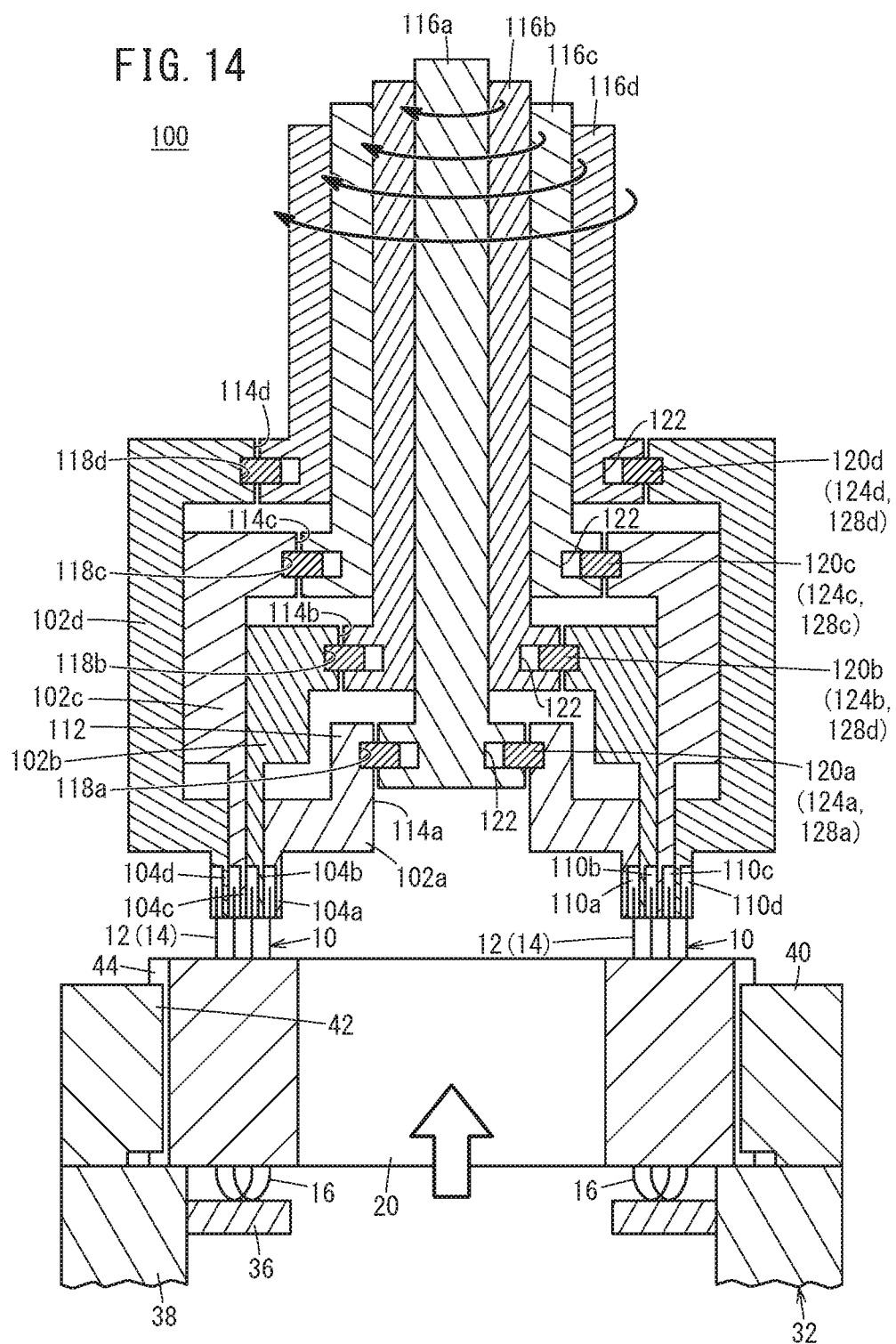
FIG. 14 is a longitudinal sectional view of the principal portions, the longitudinal sectional view depicting a state where all the spindles are rotating and performing twisting and bending on all the segments.

In this state, as depicted in FIG. 14, all of the first to fourth rotary shafts 116a to 116d rotate at a predetermined angle by the action of the above-described rotating and driving mechanisms. The first to fourth spindles 102a to 102d follow this and rotate at a predetermined angle. This is because the first to fourth spindles 102a to 102d are coupled to the first to fourth rotary shafts 116a to 116d via the first to fourth engaging pins 120a to 120d. The directions of rotation of the first to fourth rotary shafts 116a to 116d and thus of the first to fourth spindles 102a to 102d may be the same, or, as in the case of the first embodiment, the first rotary shaft 116a and the third rotary shaft 116c may rotate in a clockwise direction and the second rotary shaft 116b and the fourth rotary shaft 116d may rotate in a counterclockwise direction.

As described above, the stator core 20 continues slowly moving upward. Thus, the segments 10 are twisted so as to be inclined by the upward movement and rotation.

Next, the first spindle 102a and the second spindle 102b are rotated in a state where the rotation of the third spindle 102c and the fourth spindle 102d is stopped and twisting and bending of the segments 10 (on the outer peripheral side) of the third layer and the fourth layer from the inner peripheral side is not performed, whereby twisting and bending of the segments 10 (on the inner peripheral side) of the first layer and the second layer from the inner peripheral side is performed.

In order to do this, the rotating shafts 130 in the third spindle 102c and the fourth spindle 102d are rotated and the third pinions 128c and the fourth pinions 128d are rotated. Since the third racks 124c and the fourth racks 124d engage the third pinions 128c and the fourth pinions 128d, respectively, as depicted in FIG. 15, the third engaging pins 120c and the fourth engaging pins 120d move backward (are displaced) in the direction in which the third engaging pins 120c and the fourth engaging pins 120d move away from the third engagement holes 118c and the fourth engagement holes 118d. The third engaging pins 120c and the fourth engaging pins 120d are eventually separated from the third engagement holes 118c and the fourth engagement holes 118d, which results in detachment of the third spindle 102c and the fourth spindle 102d from the third rotary shaft 116c and the fourth rotary shaft 116d. That is, the third engaging pins 120c and the fourth engaging pins 120d stop functioning as the stoppers with the backward movement (displacement) thereof.

Since the stator core 20 still continues moving upward, the segments 10 (the linear portions) are displaced upward. As a result, the third spindle 102c, the fourth spindle 102d, and the receiving jigs are pressed by the linear portions. Since the third spindle 102c and the fourth spindle 102d are already detached from the third rotary shaft 116c and the fourth rotary shaft 116d, the third spindle 102c, the fourth spindle 102d, and the receiving jigs are displaced upward by being pressed by the linear portions. Therefore, as depicted in FIG. 15, the third spindle 102c (the third receiving portion 104c) and the fourth spindle 102d (the fourth receiving portion 104d) are at a relatively higher level than the first spindle 102a (the first receiving portion 104a) and the second spindle 102b (the second receiving portion 104b).

In this state, the first rotary shaft 116a and the second rotary shaft 116b further rotate at a predetermined angle by the action of the above-described rotating and driving mechanisms. The first spindle 102a and the second spindle 102b follow this and rotate at a predetermined angle, and the segments 10 of the first layer and the second layer from the inner peripheral side are twisted.

With the above operations, all the ends of the segments 10 inserted into the slots are twisted and bent. Furthermore, after the third spindle 102c and the fourth spindle 102d, which finished forming, are put into a state where they cannot rotate by being detached from the third rotary shaft 116c and the fourth rotary shaft 116d, the first spindle 102a and the second spindle 102b are rotated. That is, since the linear portions on the inner peripheral side are twisted in a state where the linear portions on the outer peripheral side are prevented from being twisted, a situation in which the lengths of protrusions of the segments 10 on the outer peripheral side become small is avoided. Therefore, also in the second embodiment, the effects similar to those of the first embodiment can be obtained.

Then, the rotating shafts 130 in the third spindle 102c and the fourth spindle 102d rotate and the third pinions 128c and the fourth pinions 128d rotate. With this rotation, the third racks 124c and the fourth racks 124d move forward (are displaced) and, as depicted in FIG. 16, reengage the third engagement holes 118c and the fourth engagement holes 118d, respectively. As a result, the third spindle 102c and the fourth spindle 102d are coupled again to the third rotary shaft 116c and the fourth rotary shaft 116d, respectively, via the third engaging pins 120c and the fourth engaging pins 120d.

Next, the stator core 20 moves downward with the base 38 as depicted in FIG. 17 by the action of the above-described lifting and lowering mechanism. Since the first to fourth spindles 102a to 102d are supported by the first to fourth rotary shafts 116a to 116d, the first to fourth spindles 102a to 102d do not move downward with the downward movement of the base 38. Thus, the linear portions are exposed.

Furthermore, as a result of the exposed linear portions being joined together, an electrical path is formed between the segments 10. As a result, a stator with an electromagnetic coil formed of the coupled segments 10 is obtained.

When all of the first to fourth engaging pins 120a to 120d are moved backward and separated from the first to fourth engagement holes 118a to 118d, all of the first to fourth rotary shafts 116a to 116d are detached from the first to fourth spindles 102a to 102d. In this state, by moving the first to fourth rotary shafts 116a to 116d upward by the action of the above-described second lifting and lowering mechanism, it is possible to remove the first to fourth rotary shafts 116a to 116d from the first to fourth spindles 102a to 102d. The first to fourth spindles 102a to 102d only have to be placed on, for example, a placement platform or the like in advance.

Thus, the first to fourth spindles 102a to 102d can be changed to spindles that fit the diameter of the stator core 20, for example. That is, greater versatility is achieved.

In the second embodiment, description has been given by taking up, as an example, a case in which, after all the segments 10 are twisted, the segments 10 of the first layer and the second layer from the inner peripheral side are further twisted in a state where the segments 10 of the third layer and the fourth layer from the inner peripheral side are prevented from being twisted; however, as in the case of the first embodiment, settings may be made so that the segments 10 subjected to twisting and bending on the outer peripheral side are sequentially prevented from being twisted one by one from the outer peripheral side. In this case, the engaging pins provided in the spindle that has twisted the segment 10 on the outer peripheral side subjected to twisting and bending only have to be moved backward in the direction in which the engaging pins are separated from the corresponding engagement holes.

Next, a stator production apparatus 200 according to a third embodiment will be described.

FIG. 18 is a horizontal sectional view of principal portions of the stator production apparatus 200 according to the third embodiment. In addition to a fourth spindle 202 located on the outermost periphery, this stator production apparatus 200 has unillustrated first to third spindles. In this case, as in the case of the stator production apparatus 30 according to the first embodiment, the first spindle, the second spindle, the third spindle, and the fourth spindle 202 are provided in this order from the inner peripheral side and the lengths in the direction of the axis (heights) thereof become smaller in this order. That is, the spindle on the outer peripheral side is shorter than the spindle on the inner peripheral side.

On the side of the fourth spindle 202, a fourth driving housing 204 which is slightly longer than the fourth spindle 202 is attached. The fourth driving housing 204 is driven and rotated by the action of an unillustrated rotating and driving mechanism (rotating mechanism) and a plurality of (in this case, four) driving shafts 206 are provided therein. These driving shafts 206 synchronously rotate by the action of an unillustrated driving mechanism. At a lower end of each driving shaft 206, a fourth hook pin 208 is provided in a coupled manner. Each fourth hook pin 208 turns with the rotation of the driving shaft 206 and the turn center is the driving shaft 206.

Around the fourth hook pin 208, a pin groove 210 is formed. Furthermore, in the fourth driving housing 204, four cam followers 212 are provided.

Meanwhile, in the outer peripheral wall of the fourth spindle 202, fourth arc-shaped concave portions 214 and guide rails 216 which the fourth hook pins 208 and the cam followers 212 respectively engage are formed individually. As a result of the fourth hook pins 208 engaging the fourth arc-shaped concave portions 214, the fourth driving housing 204 and the fourth spindle 202 are coupled via the fourth hook pins 208.

Though not depicted in the drawing, also on the side of the third spindle, a third driving housing that is coupled to the third spindle via third hook pins provided in the driving shafts is provided. Since the fourth spindle 202 is longer than the third spindle, the third driving housing is located above the fourth spindle 202. Moreover, also on the sides of the second spindle and the first spindle, a second driving housing and a first driving housing that are coupled to the second spindle and the first spindle via second hook pins and first hook pins, respectively, are provided. The second driving housing is located above the third spindle, and the first driving housing is located above the second spindle.

It goes without saying that, between the first to third spindles and the first to third driving housings, cam followers slidably engaging guide rails are interposed.

When a stator is produced by using the stator production apparatus 200 according to the third embodiment which is constructed as described above, all of the first hook pins to the fourth hook pins 208 are made to engage the first arc-shaped concave portions to the fourth arc-shaped concave portions 214 of the first spindle to the fourth spindle 202 in advance. In this state, in a manner similar to the first and second embodiments, the stator core 20 with the slots into which the linear portions are inserted is moved upward with the lifting and lowering platform 32.

By this upward movement, the (innermost peripheral) linear portion of the first layer from the inner peripheral side is inserted into a first insertion concave portion, and the linear portion of the second layer from the inner peripheral side is inserted into a second insertion concave portion. Likewise, the linear portions of the third layer and the fourth layer from the inner peripheral side are inserted into a third insertion concave portion and a fourth insertion concave portion, respectively. Moreover, the other linear portion of each segment 10 is inserted into an insertion concave portion of an unillustrated receiving jig.

The first spindle to the fourth spindle 202 are coupled to the first driving housing to the fourth driving housing 204 via the first hook pins to the fourth hook pins 208. This restricts the movements of the first spindle to the fourth spindle 202 in the height direction of the stator core 20 (the direction of the axis of the linear portion). That is, the movements of the first spindle to the fourth spindle 202 are restricted by the first hook pins to the fourth hook pins 208.

In this state, all of the above-described rotating and driving mechanisms are actuated and all of the first driving housing to the fourth driving housing 204 rotate at a predetermined angle. The first spindle to the fourth spindle 202 follow this and rotate at a predetermined angle. This is because the first spindle to the fourth spindle 202 are coupled to the first driving housing to the fourth driving housing 204 via the first hook pins to the fourth hook pins 208. The directions of rotation of the first driving housing to the fourth driving housing 204 may be the same, or as in the case of the first embodiment, the first driving housing and the third driving housing may rotate in a clockwise direction and the second driving housing and the fourth driving housing 204 may rotate in a counterclockwise direction.

As described earlier, the stator core 20 continues slowly moving upward. Thus, the segments 10 are twisted so as to be inclined by the upward movement and rotation.

Next, by rotating the first spindle and the second spindle in a state where the rotation of the third spindle and the fourth spindle 202 is stopped and twisting and bending of the segments 10 (on the outer peripheral side) of the third layer and the fourth layer from the inner peripheral side is not performed, twisting and bending of the segments 10 (on the inner peripheral side) of the first layer and the second layer from the inner peripheral side is performed.

In order to do this, the driving shafts 206 in the third spindle and the fourth spindle 202 are rotated. As a result, the third hook pins and the fourth hook pins 208 follow this and turn (are displaced). The third hook pins and the fourth hook pins 208 are separated from the third arc-shaped concave portions and the fourth arc-shaped concave portions 214 and enter the pin grooves 210. As a result, the third spindle and the fourth spindle 202 are detached from the third driving housing and the fourth driving housing 204. That is, the third hook pins and the fourth hook pins 208 stop functioning as the stoppers with turning (displacement).

Since the stator core 20 is still moving upward, the segments 10 (the linear portions) are displaced upward. As a result, the third spindle, the fourth spindle 202, and the receiving jigs are pressed by the linear portions. Since the third spindle and the fourth spindle 202 are already detached from the third driving housing and the fourth driving housing 204, the third spindle, the fourth spindle 202, and the above-described receiving jigs are displaced upward by being pressed by the linear portions. Thus, the third spindle (a third receiving portion) and the fourth spindle 202 (a fourth receiving portion) are at a relatively higher level than the first spindle (a first receiving portion) and the second spindle (a second receiving portion). At the time of this upward movement, the cam followers 212 of the third spindle and the fourth spindle 202 are guided by the guide rails 216.

In this state, the first driving housing and the second driving housing further rotate at a predetermined angle by the action of the above-described rotating and driving mechanisms. The first spindle and the second spindle follow this and rotate at a predetermined angle, and the linear portions located in the first layer and the second layer from the inner peripheral side are twisted.

By the above operations, all the ends of the segments 10 are twisted and bent. In addition thereto, the first spindle and the second spindle are made to rotate after putting the third spindle and the fourth spindle 202, which finished forming, into a state where they cannot rotate as a result of being detached from the third driving housing and the fourth driving housing 204. That is, also in the third embodiment, the linear portion located on the inner peripheral side is twisted in a state where the linear portion located on the outer peripheral side is prevented from being twisted. As a result, since a situation in which the lengths of protrusions of the segments 10 on the outer peripheral side become small is avoided, the effects similar to those of the first and second embodiments can be obtained.

Then, the driving shafts 206 in the third spindle and the fourth spindle 202 are rotated. As a result, the third hook pins and the fourth hook pins 208 follow this and turn (are displaced), and enter the third arc-shaped concave portions and the fourth arc-shaped concave portions 214 from the pin grooves 210. That is, the third hook pins and the fourth hook pins 208 reengage the third arc-shaped concave portions and the fourth arc-shaped concave portions 214. By this reengagement, the third spindle and the fourth spindle 202 are coupled again to the third driving housing and the fourth driving housing 204, respectively, via the third hook pins and the fourth hook pins 208.

In this state, the stator core 20 moves downward with the base 38. As a result, the linear portions are exposed. Furthermore, as a result of the exposed linear portions being joined together, an electrical path is formed between the segments 10, whereby a stator with an electromagnetic coil formed of the coupled segments 10 is obtained.

In the third embodiment, as in the case of the first embodiment, settings can also be made so that the segments 10, which were subjected to twisting and bending, on the outer peripheral side are sequentially prevented from being twisted one by one. In this case, after completion of twisting of the linear portion on the outer peripheral side, the hook pins provided in the driving housing that has rotated to twist the linear portion only have to be turned in a direction in which the hook pins are separated from the arc-shaped concave portions of the corresponding spindle.

The present invention is not particularly limited to the above-described first to third embodiments and can be changed in various ways within the scope of the present invention.

For example, the spindles may be moved upward and downward by racks/pinions.

What is claimed is:

1. A method for producing a stator, the method by which a stator is obtained by inserting, into slots formed in a circumferential direction of a stator core, segments for a coil, each being substantially in a shape of a letter U and including a first linear portion and a second linear portion which extend substantially in parallel with each other and face each other and a turn portion which connects to the first linear portion and the second linear portion, the method comprising:
   a step of inserting a plurality of the segments for the coil into the slots in a parallel state, with one of the first linear portion and the second linear portion being located on an inner peripheral side of the stator core and another of the first linear portion and the second linear portion being located on an outer peripheral side;
   a step of inserting an end of the first linear portion or the second linear portion, the end exposed from the slot, into each of insertion concave portions of a plurality of twisting and bending jigs which are independently rotatable;
   a step of twisting and bending all the segments for the coil by rotating all of the plurality of twisting and bending jigs at a predetermined angle while moving the stator core toward the plurality of twisting and bending jigs; and
   a step of further twisting and bending the segments for the coil on the inner peripheral side by putting the segment for the coil on the outer peripheral side into a state where the segment for the coil is not twisted by not allowing the twisting and bending jig with the insertion concave portion into which the end of the first linear portion or the second linear portion of the segment for the coil is inserted, to rotate, and rotating, at a predetermined angle, the twisting and bending jigs with the insertion concave portions into which the ends of the first linear portions or the second linear portions of the segments for the coil on the inner peripheral side are inserted while moving the stator core toward the plurality of twisting and bending jigs.

2. The method for producing a stator according to claim 1, wherein
   by moving, when the segments for the coil on the inner peripheral side are twisted and bent, the twisting and bending jig with the insertion concave portion into which the end of the first linear portion or the second linear portion of the segment for the coil on the outer peripheral side is inserted, in a direction in which the twisting and bending jig moves away from the stator core, the twisting and bending jig is put into a state where the twisting and bending jig is not allowed to rotate.

3. A stator production apparatus for obtaining a stator by twisting and bending segments for a coil which are inserted into slots formed in a circumferential direction of a stator core, the segments for a coil each being substantially in a shape of a letter U and including a first linear portion and a second linear portion which extend substantially in parallel with each other and face each other and a turn portion which connects to the first linear portion and the second linear portion, the stator production apparatus comprising:
   a stator core holding jig configured to hold the stator core with the slots into which a plurality of the segments for the coil are inserted in a parallel state, with one of the first linear portion and the second linear portion being located on an inner peripheral side of the stator core and another of the first linear portion and the second linear portion being located on an outer peripheral side;
   a plurality of twisting and bending jigs configured to be independently rotatable and including insertion concave portions formed therein, wherein an end, which is exposed from the slot, of the first linear portion or the second linear portion is inserted into the insertion concave portions;
   rotating mechanisms, each configured to rotate a corresponding one of the plurality of twisting and bending jigs;
   a displacing mechanism configured to displace the stator core holding jig in a direction in which the stator core holding jig moves away from or closer to the twisting and bending jigs; and
   stoppers configured to restrict or allow movements, in a height direction of the stator core, of the plurality of twisting and bending jigs by being displaced.

4. The stator production apparatus according to claim 3, wherein the stoppers release the twisting and bending jigs which finished twisting of the segments for the coil and allow the twisting and bending jigs to move in the height direction of the stator core.

5. The stator production apparatus according to claim 3, wherein the stoppers are pistons.

6. The stator production apparatus according to claim 3, wherein the stoppers are displaceable pins.

7. The stator production apparatus according to claim 6, wherein the pins are pins configured to move in a straight line.

8. The stator production apparatus according to claim 6, wherein the pins are pins configured to turn.

* * * * *